(12) United States Patent
Rand et al.

(10) Patent No.: US 12,294,206 B2
(45) Date of Patent: May 6, 2025

(54) CABLE HANGERS

(71) Applicant: Affordable Wire Management, LLC, Bedminster, NJ (US)

(72) Inventors: Scott Robert Rand, Bedminster, NJ (US); Daniel Robert Smith, Bedminster, NJ (US)

(73) Assignee: Affordable Wire Management, LLC, Bedminster, NJ (US)

( * ) Notice: Subject to any disclaimer, the term of this patent is extended or adjusted under 35 U.S.C. 154(b) by 0 days.

(21) Appl. No.: 18/920,349

(22) Filed: Oct. 18, 2024

(65) Prior Publication Data

US 2025/0047083 A1 Feb. 6, 2025

Related U.S. Application Data

(63) Continuation of application No. 18/784,025, filed on Jul. 25, 2024, which is a continuation of application No. 17/590,498, filed on Feb. 1, 2022, now Pat. No. 12,074,417, which is a continuation of application No. 17/597,880, filed as application No. PCT/US2021/027399 on Apr. 15, 2021, now Pat. No. 11,979,008.

(60) Provisional application No. 63/011,623, filed on Apr. 17, 2020.

(51) Int. Cl.
*F16L 3/00* (2006.01)
*F16L 3/06* (2006.01)
*H02G 3/00* (2006.01)
*H02G 3/04* (2006.01)

(52) U.S. Cl.
CPC .............. *H02G 3/0456* (2013.01); *F16L 3/06* (2013.01); *H02G 3/263* (2013.01)

(58) Field of Classification Search
None
See application file for complete search history.

(56) References Cited

U.S. PATENT DOCUMENTS

| | | | |
|---|---|---|---|
| 231,552 A | 8/1880 | Finney |
| 477,753 A | 6/1892 | Goold |
| 916,306 A | 3/1909 | Hall |
| 1,132,999 A | 3/1915 | Beers |
| 1,401,998 A | 1/1922 | Manz |

(Continued)

FOREIGN PATENT DOCUMENTS

| KR | 200488728 Y1 | 3/2019 |
|---|---|---|
| WO | 2021211788 A1 | 10/2021 |

OTHER PUBLICATIONS (Sep. 29-Oct. 2, 2012) "NECA Energy Forum", Bright Lights. Big Ideas., Mandalay Bay, 32 pages.

(Continued)

*Primary Examiner* — Steven M Marsh
(74) *Attorney, Agent, or Firm* — Mintz, Levin, Cohn, Ferris, Glovsky and Popeo, P.C.

(57) ABSTRACT

Systems are provided for a cable hangers. A system for cable hangers can include a cable hanger having a support member including a proximal end and a distal end. A plurality of saddles are attached to and extend from the support member, with each saddle of the plurality of saddles being configured to support at least one cable on a cable supporting surface. A hanging mechanism is arranged at the proximal end of the support member, where the hanging mechanism is offset on the support member.

12 Claims, 38 Drawing Sheets

(56) References Cited

U.S. PATENT DOCUMENTS

| | | | |
|---|---|---|---|
| 1,448,141 A | 3/1923 | Manz et al. | |
| 1,464,535 A | 8/1923 | Mcgivern | |
| 1,754,924 A | 4/1930 | Williams | |
| 1,766,873 A | 6/1930 | Birch | |
| 1,841,479 A | 1/1932 | Jessen | |
| 2,201,472 A | 5/1940 | Browder et al. | |
| 2,384,440 A | 9/1945 | Carr | |
| 2,820,083 A | 1/1958 | Hendrix | |
| 2,917,259 A | 12/1959 | Hill | |
| 3,001,749 A | 9/1961 | Petersen | |
| 3,042,351 A | 7/1962 | Du Bois | |
| 3,363,048 A | 1/1968 | Vaughn | |
| 3,559,910 A | 2/1971 | Babb | |
| 3,923,277 A | 12/1975 | Perrault et al. | |
| 4,429,797 A * | 2/1984 | Collins | A47G 25/743 |
| | | | 211/119 |
| 4,709,888 A | 12/1987 | Cubit et al. | |
| 5,123,618 A * | 6/1992 | Guterman | H02G 3/0456 |
| | | | 248/68.1 |
| 5,564,658 A | 10/1996 | Rinderer | |
| 5,868,361 A | 2/1999 | Rinderer | |
| 6,198,047 B1 * | 3/2001 | Barr | H02G 3/0456 |
| | | | 174/101 |
| 6,299,118 B1 | 10/2001 | Farrell | |
| 6,565,048 B1 | 5/2003 | Meyer | |
| 7,520,476 B2 | 4/2009 | Caveney et al. | |
| 8,220,757 B2 * | 7/2012 | Gardner | F16L 3/22 |
| | | | 248/74.1 |
| 8,840,071 B2 | 9/2014 | Oh et al. | |
| 9,166,385 B2 | 10/2015 | Newman | |
| 9,800,028 B1 | 10/2017 | Smith et al. | |
| 10,003,298 B2 | 6/2018 | Grushkowitz et al. | |
| 10,177,551 B1 | 1/2019 | Smith et al. | |
| 11,349,291 B2 | 5/2022 | Smith et al. | |
| 11,979,008 B2 | 5/2024 | Rand et al. | |
| 12,074,417 B2 | 8/2024 | Rand et al. | |
| 2001/0038738 A1 | 11/2001 | Akasaka et al. | |
| 2004/0113024 A1 | 6/2004 | Caveney et al. | |
| 2010/0139731 A1 | 6/2010 | Almy | |
| 2012/0267483 A1 * | 10/2012 | Colvin | H02G 3/263 |
| | | | 248/62 |
| 2017/0241603 A1 * | 8/2017 | Freeman | F16L 3/227 |
| 2022/0255300 A1 | 8/2022 | Rand et al. | |
| 2022/0263300 A1 | 8/2022 | Rand et al. | |

OTHER PUBLICATIONS (Jul. 2017) "A Natural History of the Wooden Utility Pole", California Public Utilites Commision, Exhibit No. EX1012, 38 pages.
(1959) "Advance Reports Proposed National Electrical Code", Advance Reports, NFPA, vol. II, 515 pages.
"CAB Cable Rings and Saddles for Solar Cable Management", Affordable Wire Management, Exhibit No. EX1005 https://web.archive.org/web/20150204050108/http:/www.cabproducts.com/cable-rings-solar/, Accessed on Nov. 11, 2024, 5 pages.
(Sep. 18, 2014) "Cable Management in Solar PV Arrays: A Review of Requirements in the National Electrical Code and how CAB Cable Rings and Saddles Meet These Requirements", Affordable Wire Management, Exhibit No. EX1006, 17 pages.
"Early Power Distribution", Water and Power Associates, Accessed on Sep. 26, 2023, 56 pages.
(Nov. 29, 1996) "Facilities Engineering Electrical Exterior Facilities", Departments of the Army, the Navy, and the Air Force, 201 pages.
(2013) "Hendrix Covered Conductor Manual", Western Power, 56 pages.
(2007) "IEEE Guide for the Design and Installation of Cable Systems in Substations", IEEE-SA Standards Board, 129 pages.
(Mar. 14, 2011) "IEEE Recommended Practice for Cable Installation in Generating Stations and Industrial Facilities", IEEE Power & Energy Society, Std 1185, 98 pages.
(2007) "IEEE Recommended Practice for Grounding of Industrial and Commercial Power Systems", IEEE Std 142-2007, 225 pages.
(May-Jun. 2012) "Integration Meets Main Street: City of Glendale Takes on the Smart Grid Challenge", Electric Energy T&D, 16(3):72 pages.
(Jul. 31, 2001) "National Electrical Safety Code Committee, Accredited Standards Committee C2", National Electrical Safety Code Interpretation, 10 pages.
"NEMAS—New Cable Tie "Type" Classifications", Cable Tie "Type" Classifications—Including Type 21S, Advanced Cable Ties, Inc., Accessed on Nov. 3, 2023, 7 pages.
(2008) "NFPA 70, National Electrical Code", Important Notices and Disclaimers Concerning NFPA Documents, 2008 Edition, 840 pages.
"Pole Line Hardware Catalog", MacLean Power Systems, Issued: May 2010, 139 pages.
(Sep. 1984) "Safety Requirements for Wiring Systems and Connectors for Photovoltaic Systems", Underwriters Laboratories Inc., Affordable Wire Management, Exhibit No. EX1007, 87 pages.
(Oct. 26, 2012) "Solar Snake Tray® Announces New Cable Tray That Attaches to Messenger Wire Rope for Solar Installations", The Wayback Machine, https://web.archive.org/web/20121203093617/http://snaketray.com/solarsnake-tray-announces-new-cable-tray-that-attaches-to-messengerwire-rope-for-solar-installations/, 1 page.
(Jul. 29, 2024) "Span Wire and Messenger Cable Details", State of Tennessee Department of Transportation, 1 page.
"Steel Distribution Poles", American Galvanizers Association, Access date Nov. 7, 2024, 1 page.
(Sep. 2012) "Traffic Signal Support Structures Timber Pole Assemblies", Texas Department of Transportation Fort Worth Distric, 3 pages.
(2012) "Triplex Service Drop", Aluminum Conductors. Polyethylene or Crosslinked Polyethylene Insulation, 4 pages.
Dvorak, Paul (May 11, 2012) "Cable Spacers Solve Problem of Many Cables and not Much Pole Space", https://www.windpowerengineering.com/cable-spacers-solve-problem-of-many-cables-and-not-much-pole-space/, 4 pages.
Jacoby, Tommy (Feb./Mar. 2013) "PV Array Wire Management, Securing, Supporting and Protecting Conductors within the PV Array", SolarPro, 11 pages.
Jung et al. (Jan. 2020) "An In-depth Analysis for Optimal Cable Tray Support Span", Sustainable Marine Structures, 2(1):46-59.
Seo et al. (2016) "Applicability of Messenger Wire for Purpose of Lightning Protection", Journal of Electrical Engineering and Technology, 11(1):167-174.
Stockton, Blaine D. (Apr. 25, 2001) "Electric Distribution Line Guys and Anchors", United States Department of Agriculture Rural Utilities Service, 29 pages.
Zipse, Donald W. (Sep. 18-20, 2017) "History of Grounding/ Earthing Practices In the United States", IEEE, 14 pages.
International Search Report and Written Opinion issued in International Application No. PCT/US2021/027399, mailed on Jul. 14, 2021, 7 pages.

* cited by examiner

CABLE HANGERS

CROSS-REFERENCE

The present application is a Continuation of U.S. application Ser. No. 18/784,025, filed on Jul. 25, 2024 and entitled "CABLE HANGERS," which is a Continuation of U.S. application Ser. No. 17/590,498, filed on Feb. 1, 2022 and entitled "CABLE HANGERS," which is a Continuation of U.S. application Ser. No. 17/597,880, filed on Jan. 27, 2022 and entitled "CABLE HANGERS," which claims priority under 35 U.S.C. 111 to PCT Application No. PCT/US2021/027399, filed on Apr. 15, 2021 and entitled "CABLE HANGERS," which claims priority under 35 U.S.C. § 119(e) to U.S. Application No. 63/011,623, filed on Apr. 17, 2020 and entitled "CABLE HANGER," which are hereby incorporated by reference in its entirety.

FIELD

The present disclosure relates generally to cable hangers for cables.

BACKGROUND

Energy production and transmission infrastructures utilize a number of cable types to convey electrical current, and/or signal data from source facilities to consumer locations. In large-scale solar power plants, cables can convey electrical current and signal data from solar panels to other production and/or transmission equipment within the plant. The cables can be arranged in underground or above-ground configurations. Above-ground cable configurations can require cables to be supported in the air in a secure and safe manner, which is capable of withstanding harsh environmental conditions.

SUMMARY

In one aspect, a system for cable hangers is provided that in some implementations includes a cable hanger having a support member including a proximal end and a distal end. A plurality of saddles are attached to and extend from the support member, with each saddle of the plurality of saddles being configured to support at least one cable on a cable supporting surface. A hanging mechanism is arranged at the proximal end of the support member, where the hanging mechanism is offset on the support member.

One or more of the following features can be included in any feasible combination. The plurality of saddles can vary in numerous ways. For example, the plurality of saddles can form at least one mirrored pair of saddles along the support member from the proximal end to the distal end. In some implementations, at least one saddle can be arranged on the distal end of the support member. In some implementations, a portion of each of the plurality of saddles can be arranged at an angle less than 90° relative to the support member. In at least some implementations, the cable supporting surface can include a first portion perpendicular to the support member, and a second portion, extending from the first portion, arranged at an angle less than 90° relative to the support member. In at least some implementations, the plurality of saddles can be arranged on a single side of the support member.

The hanging mechanism can have various configurations. For example, the hanging mechanism can be a positive locking mechanism configured to secure the cable hanger to a support wire. In some implementations, the hanging mechanism can be a hook attached to the support member. In some implementations, an opening of the hook can be vertically aligned with the support member. The cable hanger can vary in numerous ways. For example, an attachment mechanism can be arranged on the distal end of the support member. In some implementations, the attachment mechanism can be a loop configured to attach with a hanging mechanism of a cable hanger. In some implementations, the hanging mechanism can be vertically aligned with a perpendicular portion of the plurality of saddles.

In another aspect, a cable hanger system for hanging a plurality of cable hangers is provided that in some implementations includes a support wire, a first cable hanger, and a second cable hanger. The first cable hanger includes a support member including a proximal end and a distal end, a plurality of saddles attached to and extending from the support member, each saddle of the plurality of saddles being configured to support at least one cable on a cable supporting surface, and a hanging mechanism arranged at the proximal end of the support member and attached to the support wire. The second cable hanger includes a support member including a proximal end and a distal end, a plurality of saddles attached to and extending from the support member, each saddle of the plurality of saddles being configured to support at least one cable on a cable supporting surface, and a hanging mechanism arranged at the proximal end of the support member. The first cable hanger is vertically aligned with the second cable hanger relative to the support wire.

The second cable hanger can have various configurations. For example, the second cable hanger can be attached to the first cable hanger by the hanging mechanism of the second cable hanger.

The cable hanger system can have various configurations. For example, an extension bar can be secured to the support wire adjacent to the first cable hanger. The extension bar can include a hanging mechanism arranged on a proximal end and an attachment mechanism arranged on a distal end. The second cable hanger can be attached to the support wire by the hanging mechanism of the extension bar.

In another aspect, a cable hanger is provided that in some implementations includes a support member including a proximal end and a distal end. A hanging mechanism is arranged at the proximal end of the support member and configured to attach the cable hanger to a support wire. An attachment mechanism is arranged at the distal end of the support member. At least one saddle extension includes a central post having a proximal end and a distal end. At least one saddle is attached to the central post and configured to support at least one cable. A securement mechanism is arranged on the proximal end and configured to attach the saddle extension to the attachment mechanism of the cable hanger, and an attachment mechanism is arranged on the distal end.

The securement mechanism can vary in numerous ways. For example, the securement mechanism of the at least one saddle extension can be removable clips. In some implementations, the securement mechanism of the at least one saddle extension can be a nut and bolt. In some implementations, the securement mechanism of the at least one saddle extension can be a pair of deformable tabs which are configured to be non-removably deformed on the attachment mechanism of the cable hanger.

The hanging mechanism can have various configurations. For example, the hanging mechanism can be offset on the support member relative to the plurality of saddles.

Accordingly, there is a need for cable hangers for organizing and supporting cables.

BRIEF DESCRIPTION OF THE DRAWINGS

The present disclosure will be more fully understood from the following detailed description taken in conjunction with the accompanying drawings, in which.

DETAILED DESCRIPTION

Figure 1A:
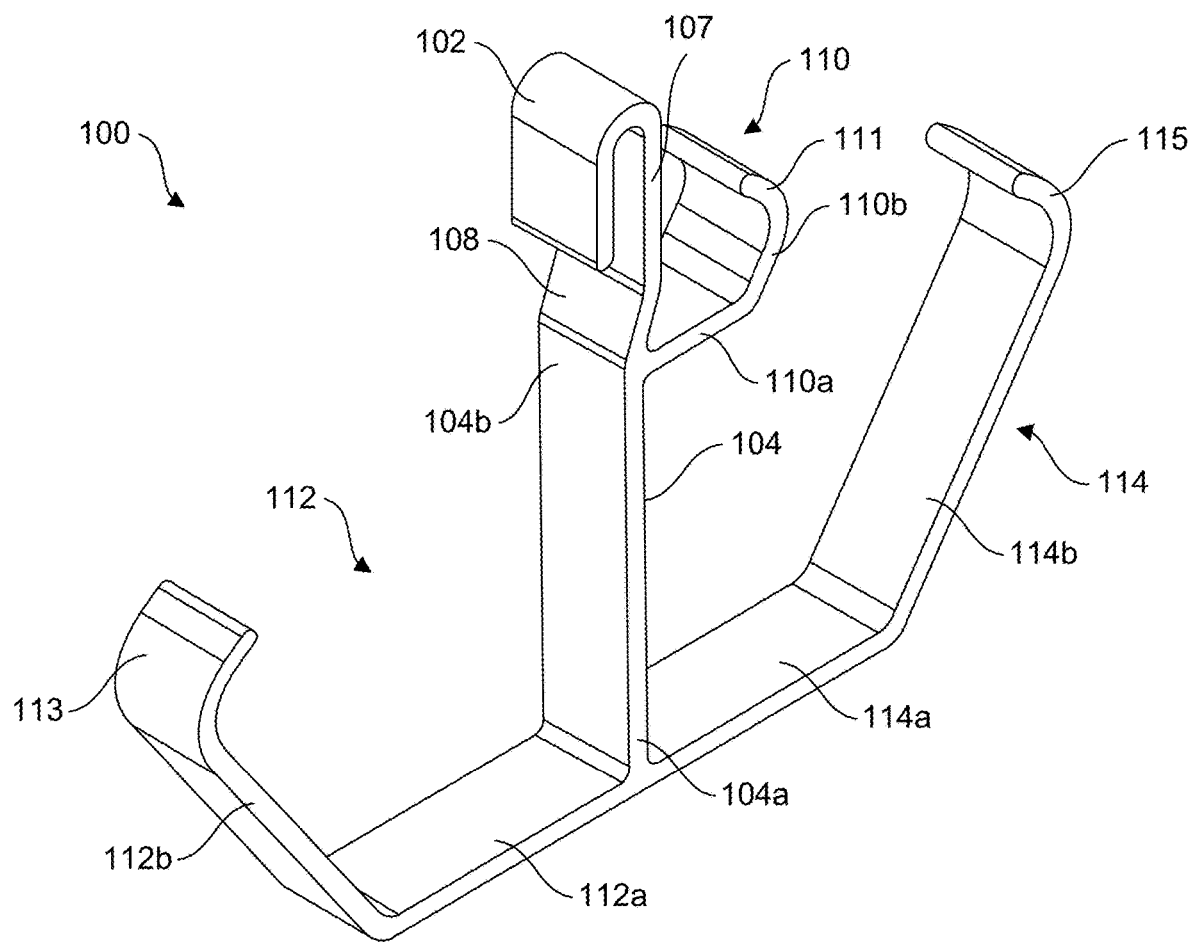
FIG. 1A is a front perspective view of one implementation of a cable hanger.

Above-ground cable configurations, such as those used in utility-scale solar power generation and transmission systems, can be deployed and managed using a cable hanger. The cable hanger can support the cables, such as power cables, in an organized and serviceable manner. A cable hanger can couple to support structures, such as a messenger cable, which can be routed between posts, columns, or other vertically oriented components located throughout a solar power plant to convey the cables from one location to another.

Cable hangers can be coupled to a messenger cable via passive attachments such as a latch, or a hook, configured on the cable hanger. Cable hangers configured with passive attachment components can become unsecured from the messenger cable, for example, during high winds and can result in displacement of the cables from the messenger cable and/or the posts to which the messenger cable can be coupled. Cable hangers configured with passive attachment components can be limited in their ability to provide an adequate bonding path between the attachment component of the cable hanger and the messenger cable to which the attachment component is attached. For example, cable hangers with passive attachment components can be displaced in high-wind environments, which can cause the surface area of contact between the attachment component and the messenger cable to be reduced. As a result, cable hangers with passive attachment components can slide along a messenger cable and can cause the distribution of weight of the power cables to change in an unsafe manner. In addition to the distribution of weight changing, the change in surface area contact can also potentially change the electrical resistance between the hanger and messenger cable, which can reduce the cable hanger's ability to be bonded to the messenger cable. In some implementations, the cable hanger can act as a grounding clamp device in accordance with UL467 standard. In this way, the cable hanger can bond an equipment grounding conductor to the steel structure that supports one or more solar panels Cable hangers can be expensive due to the large number of cable hangers required in utility-scale solar power plants. Typically, there are approximately 100 cable hangers used per 1 MW in utility-scale solar power plant operations. Currently in the United States, there is approximately 10,000 MW of installed utility-scale solar power provided per year, and therefore there is a potential of 1,000,000 hangers per year in the United States alone. Cable hangers can also be subject to harsh environmental conditions, such as high ultraviolet (UV) light, due to their exposure to direct sunlight when deployed. High UV light can deteriorate the cable hanger material causing deformations or material failure of passive attachment components, which can result in displacement of the cable hanger from the messenger cable.

Some implementations of cable hangers described herein include a cost-effective design for large-scale deployment in energy generation and transmission infrastructures, which can be advantageous as compared to passive attachment components in existing cable hangers. Some example cable hangers described herein can also include features to maintain the structural integrity of the cable hanger material when exposed to high UV light environmental conditions. Some implementations of the example cable hangers described herein can thus provide benefits of large-scale, low-cost deployment, more secure attachment to support structures (e.g., messenger cable, posts, steel beams, and the like), and extended operational life span in harsh deployment environments.

The designs of the implementations of cable hangers described herein are advantageous since the cable hangers can remain balanced when loaded with cables, helping prevent rotation of the cable hangers on a support wire. Some of the cable hangers described herein can include an offset leg arranged between the portion of the hanger attaching to the support wire, and the saddles supporting various cables. By offsetting the attachment portion, such as a hook, the center-of-gravity can remain vertically aligned with the support wire, reducing or preventing rotation of the cable hanger. Additionally, due to the designs of the cable hangers, additions can be added to cable hanger in order to increase the hanger's carrying capacity without unbalancing the cable hanger.

In an implementation, a cable hanger can include a support member, a plurality of saddles, and a hanging mechanism. The support member includes a proximal end and a distal end. The plurality of saddles are attached to and extend from the support member. The saddles are designed to support wires of a solar panel as the cables travel along the various panel and supports in a solar panel array. The cables are supported on a cable supporting surface or each saddle, with the cable supporting surface being designed to ensure that the cables do not become dislodged from the saddles. For example, the saddles can be angled upward from the support member to partially encapsulate the cables within each saddle. In order to keep the cables off the ground, the cable hangers can be attached to a support wire. A hanging mechanism is arranged at the proximal end of the support member and designed attach the cable hanger to the support wire. In some implementations, the hanging mechanism can be a deformable hook, which is crimped around the support wire. Additionally, the hanging mechanism can be offset on the support member in order to aid in balance of the cable hanger when loaded with cables.

The cable hanger can have various implementations which are used to support a plurality of cables. Implementations of the cables hanger disclosed herein can include a support member, saddles, and a hanging mechanism to support the cable hanger on a support wire.

A cable hanger can include cable saddles that vary in size, such that each of the cable saddles can be configured to support one or more cables or wires. FIGS. 1-2 illustrate an exemplary implementation of a cable hanger 100. The cable hanger 100 includes a hook 102, a center support member 104, and a plurality of cable saddles. The cable hanger 100 is configured to support wires or wires running along the length of a solar array, with multiple cable hangers being used. The cable hanger 100 can be attached to a support wire running parallel to the power cables and/or signal wires.

In an exemplary implementation, the cable hanger 100 can be manufactured as one single piece. The cable hanger 100 can be manufactured by an extrusion process and then can be cut to the desired width. In an exemplary implementation, the extruded thickness of the cable hanger 100 can be within a range of 0.375-1.5 inches, and preferably within a range of 0.375 inches-1.00 inches. During manufacturing, the cable hanger 100 can be oriented such that the burrs produced from the cutting process are facing away from the surfaces that will be in direct contact with cables or wires in order to prevent damage to cables in contact with the cable hanger 100. The cable hanger 100 can be manufactured from material such as 6063-T5 Aluminum. However, various other materials can be used to form the cable hanger 100, and should be appreciated, such as steel or plastic.

Figure 1B:
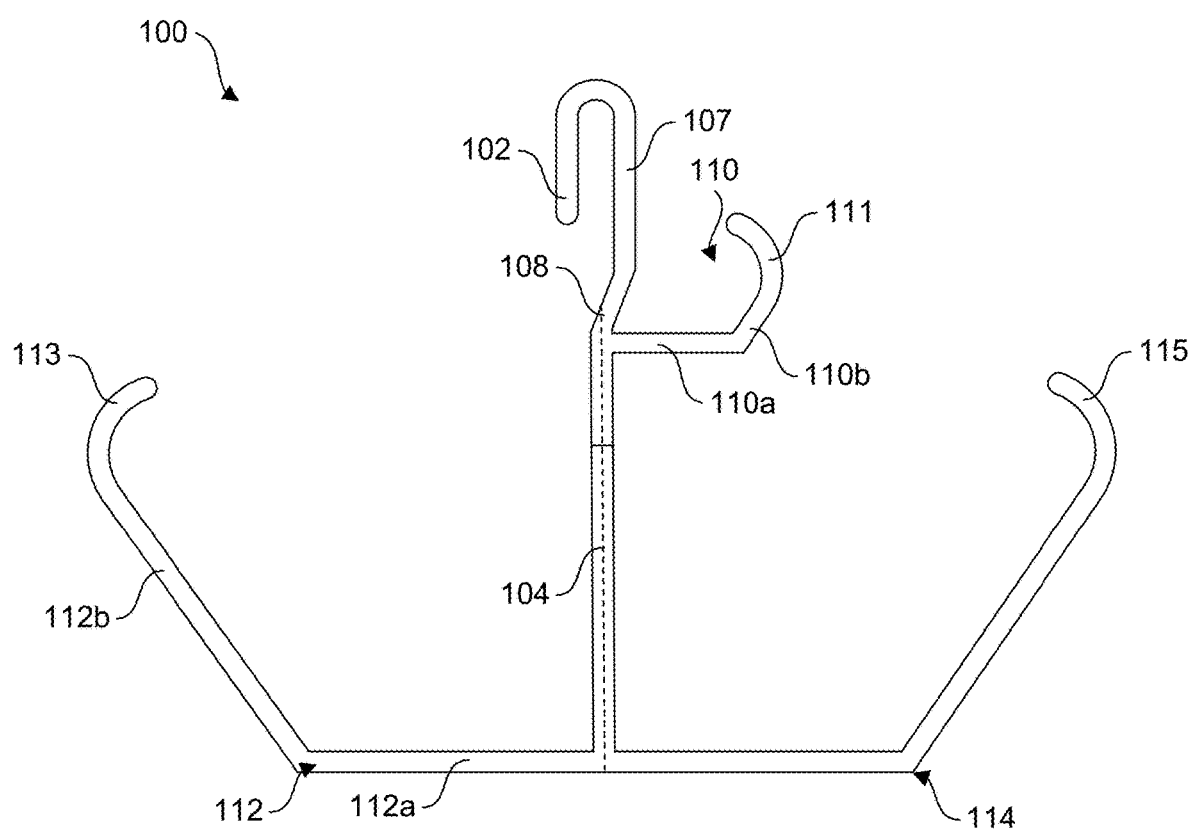
FIG. 1B is a side view of the cable hanger of FIG. 1A.

In order to support wires, the cable hanger 100 is attached to a support wire by the hook 102. The hook 102 is arranged on the proximal end 104p of the center support member 104 such that a majority of the cable hanger 100 is arranged below the support wire. As shown in FIG. 1B, the opening of the hook 102 can be wider than the upper radius of the hook 102. This can allow the support wire to sufficiently sit in the upper radius of the hook 102. As stated previously, the cable hanger 100 can be made from a deformable material, such as aluminum. The wider opening of the hook 102 can provide additional leverage onto the support wire when the hook 102 is crimped to the support wire. The crimping of the hook 102 will secure the cable hanger 100 to the support wire and prevent the cable hanger from being dislodged from the support wire.

Due to the design of the cable hanger 100, with the center-of-gravity being arranged below the hook 102, the cable hanger 100 includes an offset leg 108 connected to the hook 102 by a hook support leg 107. The offset leg 108 can be connected to the center support member 104. The offset leg 108 can be angled relative to the hook support leg 107, such that the upper radius of the hook 102 (where the support wire is installed), can be located at the vertical centerline of the center support member 104. This offset in the hook 102 can position the center-of-gravity of the cable hanger 100 directly below the support wire, and can prevent the cable hanger 100 from rotating once installed onto the support wire.

In order to properly support wires and cables, the cable hanger 100 includes a plurality of cable saddles of different shapes and sizes. In the illustrated implementation, the cable hanger 100 includes a small cable saddle 110, a large cable saddle 112, and a large cable saddle 114. The small cable saddle 110 can be arranged on the center support member 104 proximally to the saddles 112, 114. The saddles 112, 114 can be arranged on the distal end 104d of the center support member 104. The arrangement of the saddles 112, 114 at the distal end 104d can help stabilize the cable hanger 100 by lowering the center of gravity below the hook 102.

Each of the cable saddles 110, 112, 114 can vary in size, such that each of the cable saddles can be configured to support one or more cables or wires. The saddle 110 is formed from extension 110a, extending perpendicular from the center support member 104, and extension 110b, extending at an angle greater than 90° from the extension 110a, such as 125°. The extension 110b can also include a curved end 111 arranged at the end of the extension 110b. The curved end 111 can help aid in keeping cables or wires arranged within the saddle 110 from becoming dislodged. In an exemplary implementation, the saddle 110 can be configured to support wires or wires, such as the power cables to power one or more tracker motors of a solar array.

In addition to the saddle 110, the cable hanger 100 includes larger saddles 112, 114. Similar to the saddle 110, the saddle 112 is formed from extension 112a, extending perpendicular from the center support member 104, and extension 112b, extending at an angle greater than 90° from the extension 112a, such as 125°. The extension 112b can also include a curved end 113 arranged at the end of the extension 112b. Additionally, the saddle 114 is formed from extension 114a, extending perpendicular from the center support member 104, and extension 114b, extending at an angle greater than 90° from the extension 114a, such as 125°. The extension 114b can also include a curved end 115 arranged at the end of the extension 114b. The design of the saddles 112, 114 creates a channel for cables and wires to be arranged within. The curved ends 113, 115 can help aid in keeping cables arranged within the saddles from becoming dislodged. The saddles 112, 114 can be configured to support wires or wires, such as the Direct Current (DC) positive power cables or DC negative power cables.

The cable hanger 100 can be configured to hold more or less wires depending on the requirements of a deployed usage. For example, the cable saddles may be increased or decreased in size. Additionally, the location of the cable saddles with respect to the hook 102 may be modified, and the location of the cable saddles with respect to each other may be modified. The cable saddles can be spaced apart to maintain separation between various cables and wires being supported in the cable hanger 100. This spacing also allows for easy maintenance and serviceability of the cables. The spacing can also comply with the spacing requirements of the National Electrical Code (NEC), such as NEC300.3(C)(2), which states that conductors over 1000 volts should not occupy the same saddle as conductors under 1000 volts.

Figure 2A:
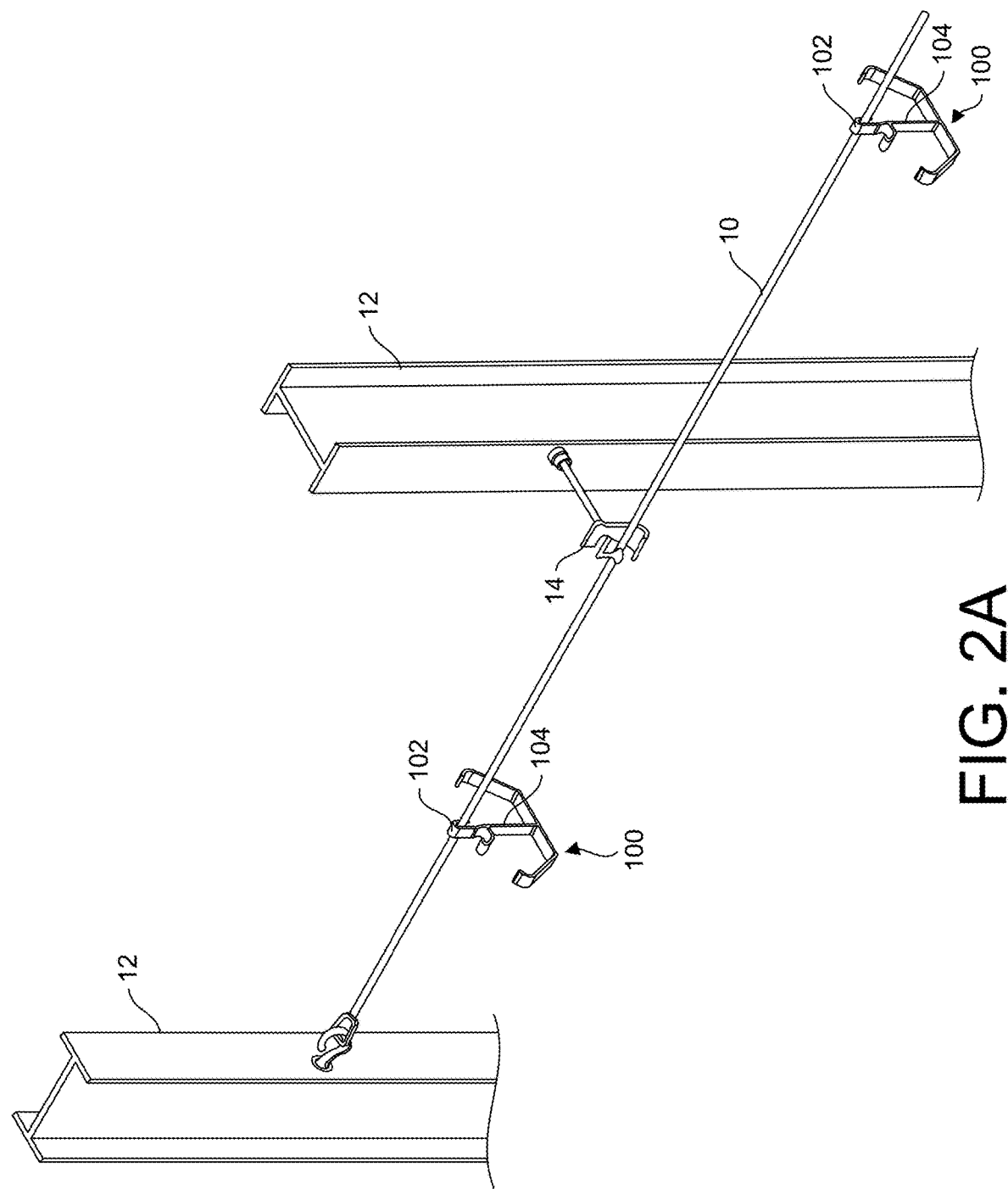
FIG. 2A is a front perspective view of a cable hanging system having the cable hanger of FIG. 1A.
Figure 2B:
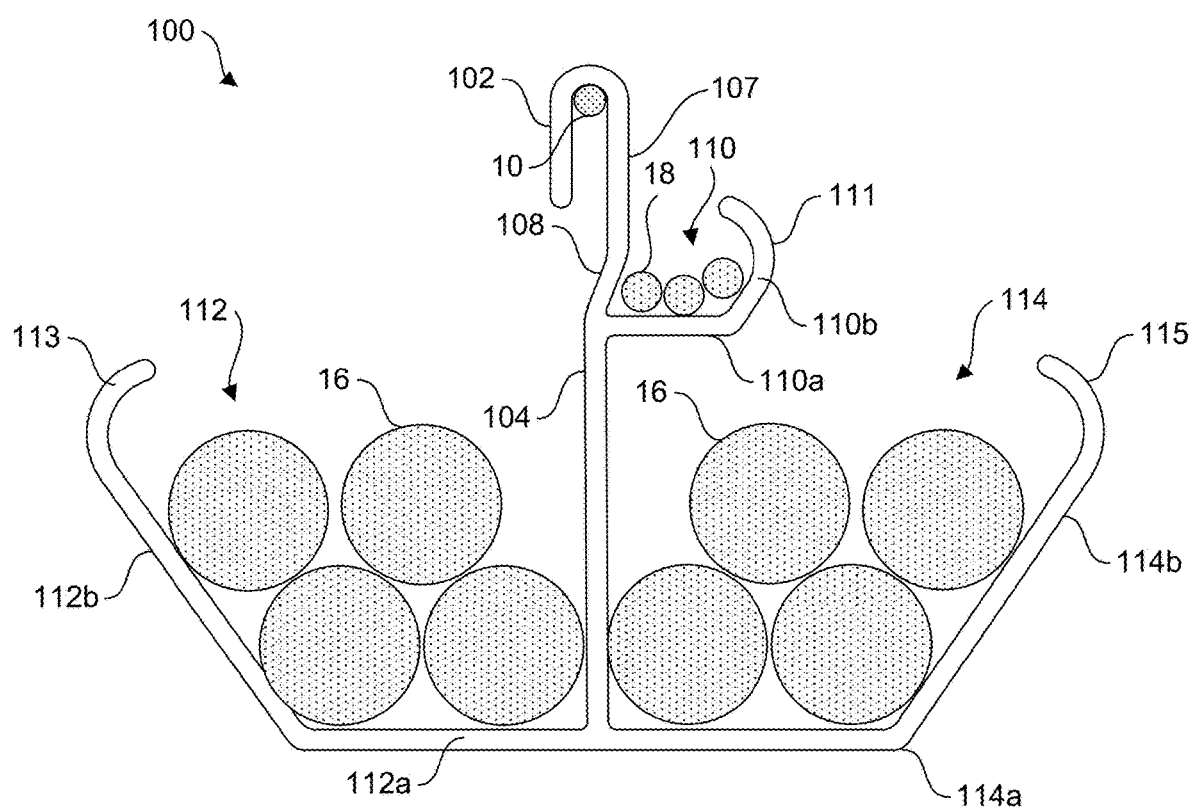
FIG. 2B is a side view of the cable hanger of FIG. 1A with cables arranged therein.

As shown in FIGS. 2A-2B, multiple cable hangers 100 can be secured to a support wire 10. The support wire 10 can be secured to stand-alone, dedicated structure piles, used to suspend the support wire off of the ground, or a steel structure commonly find on a solar power plant, such a as trackers, or fixed-tilt structure 12, using clamps 14 secured to the trackers 12. Trackers 12 can be configured to support one or more solar panels to support the support wire 10 in order to suspend the cable hangers 100 off of the ground. The cable hangers 100 can be spaced at a distance along the support wire 10 that is adequate to support cables 16 and wires 18 arranged within the saddles of the cable hanger 100. In an exemplary implementation, the cable hangers 100 can be installed on the support wire 10 at spaced intervals. As depicted in FIG. 2B, the support wire 10 is arranged within the opening of the hook 102, and the hook 102 of each cable hanger 100 is then crimped to the support wire 10 in order to secure the cable hangers 100 in place along the support wire 10. In an exemplary implementation, the support wire 10 can be a braided steel cable having a 0.25 inch diameter. The crimping of the hook 102 to the support wire 10 can serve to bond the cable hanger 100 to the support wire 10 by maintaining a desired surface area of the hanger 100 in contact with a desired surface area of the support wire 10. This can also serve to prevent the cable hanger 100 from sliding or rotating on the support wire 10. Thus, the cable hanger 100 is secured to the support wire 10 by positive mechanical means (e.g., a fastened component cannot work loose from vibrations) and meets all of the bonding requirements of a UL2703 standard. This can serve to prevent the surface contact area between the cable hanger 100 and support wire 10 from being reduced.

Once the cable hangers 100 are attached to the support wire 10, cables 16 or wires 18 can be placed into the cable saddles 110, 112, 114 of the cable hangers 100 in order to support the cables or wires while also positioning the cables 16 and wires 18 a distance away from the support wire 10. In the illustrated implementation, the wires 18, which can have a smaller diameter than the cables 16, are arranged within the saddle 110. The cables 16 are arranged within the larger saddles 112, 114. As shown, multiple cables 16 and/or wires 18 can be arranged in each saddle 110, 112, 114. In an exemplary implementation, the cables 16 can have a diameter within the range of 0.5-1.5 inches, and the wires 18 can have a diameter within the range of 0.25-0.5 inches. As mentioned previously, the hook 102 is offset from the center support member 104 by the offset leg 108. While loaded, the cable hanger 100 will have a center-of-gravity which can be vertically aligned with the support wire 10 in order to prevent rotation of the cable hanger 100 on the support wire 10.

Even though only three saddles are depicted in the implementation illustrated in FIGS. 1A-2B, the number of cable saddles may increase or decrease depending on the operational requirements of the cable hanger. Various exemplary implementations of cable hangers having different amounts, sizes, and shapes of saddles will be described in detail below.

Figure 3A:
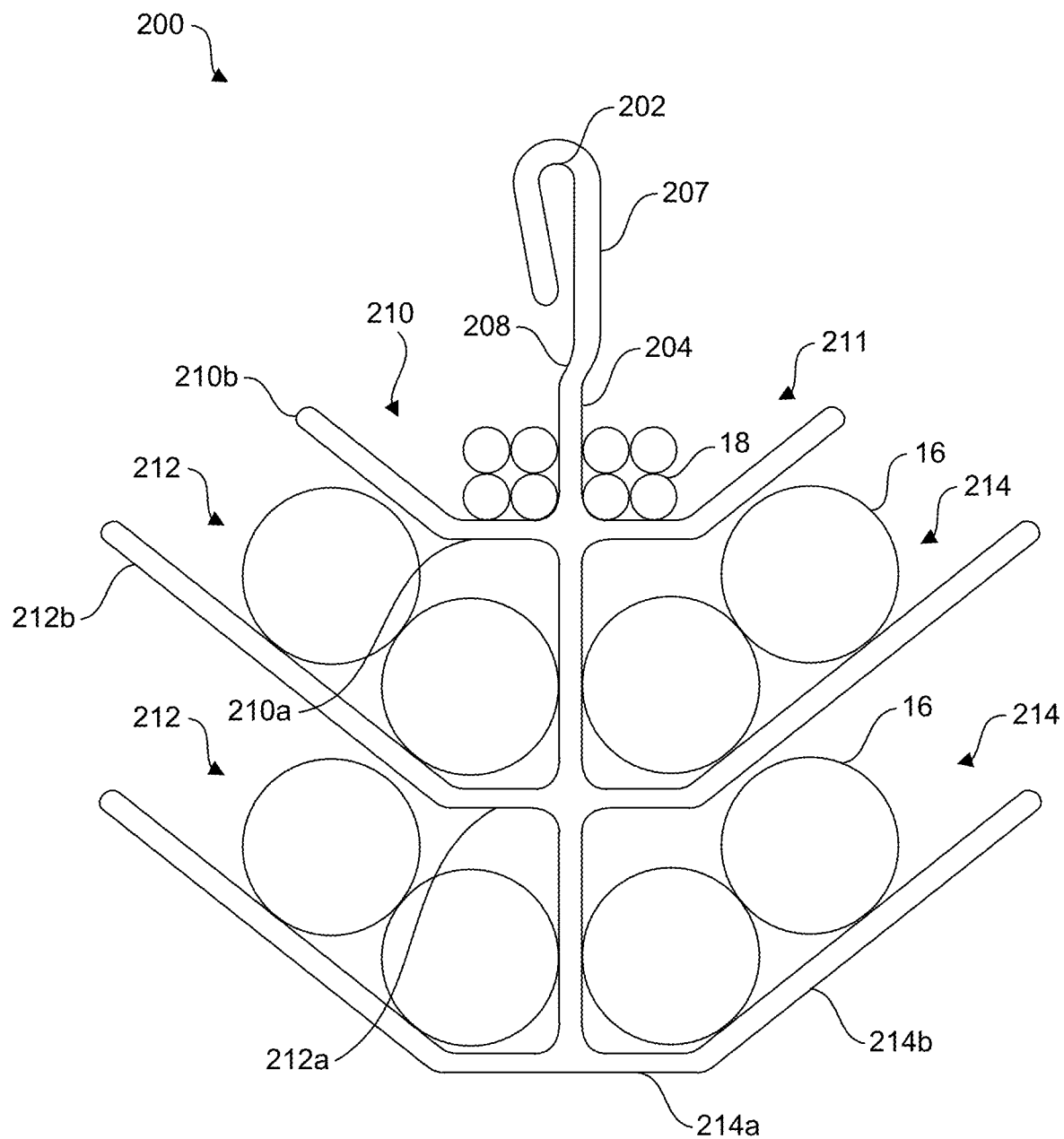
FIG. 3A is a front view of another implementation of a cable hanger.
Figure 3B:
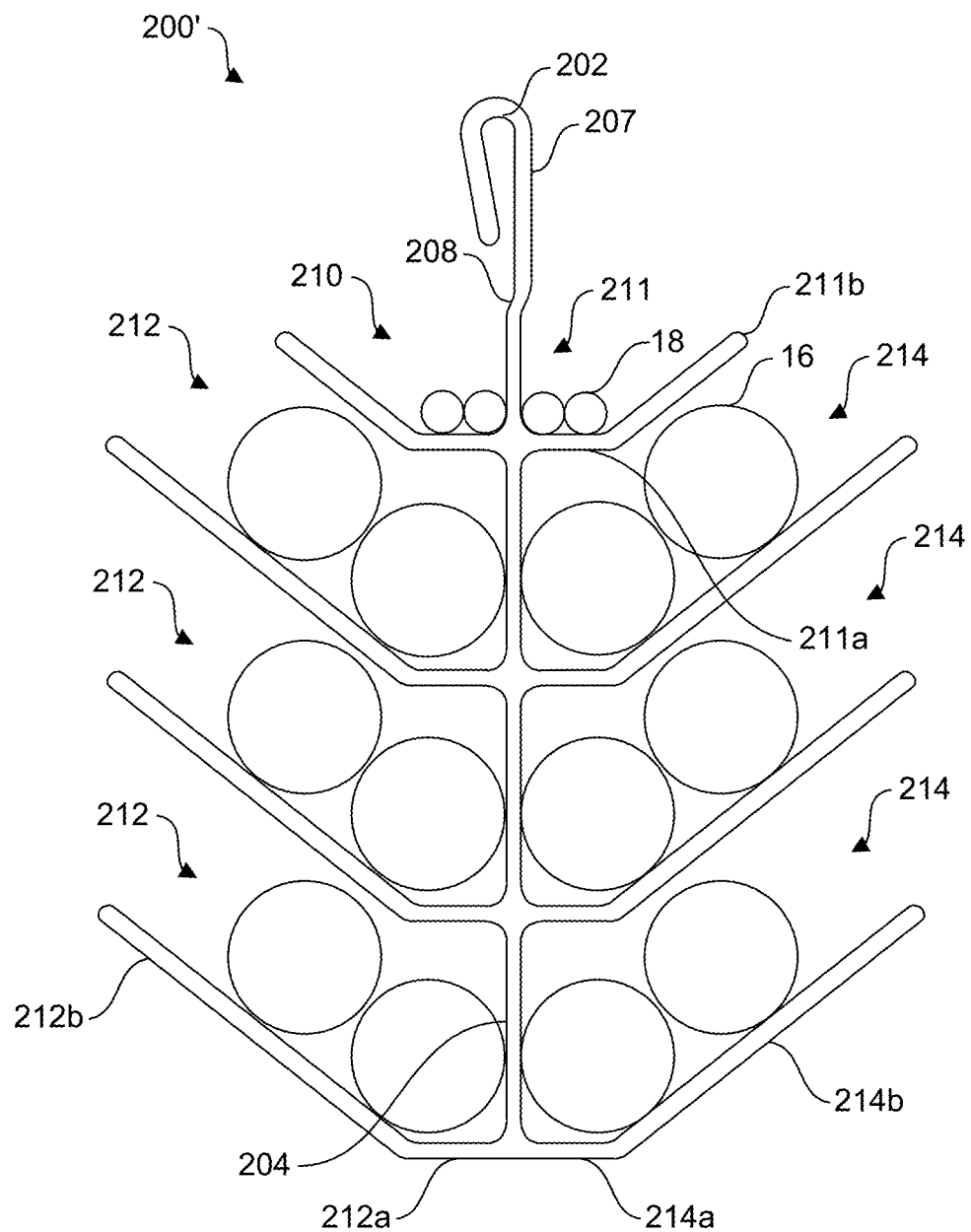
FIG. 3B is a front view of another implementation of a cable hanger.
Figure 3C:
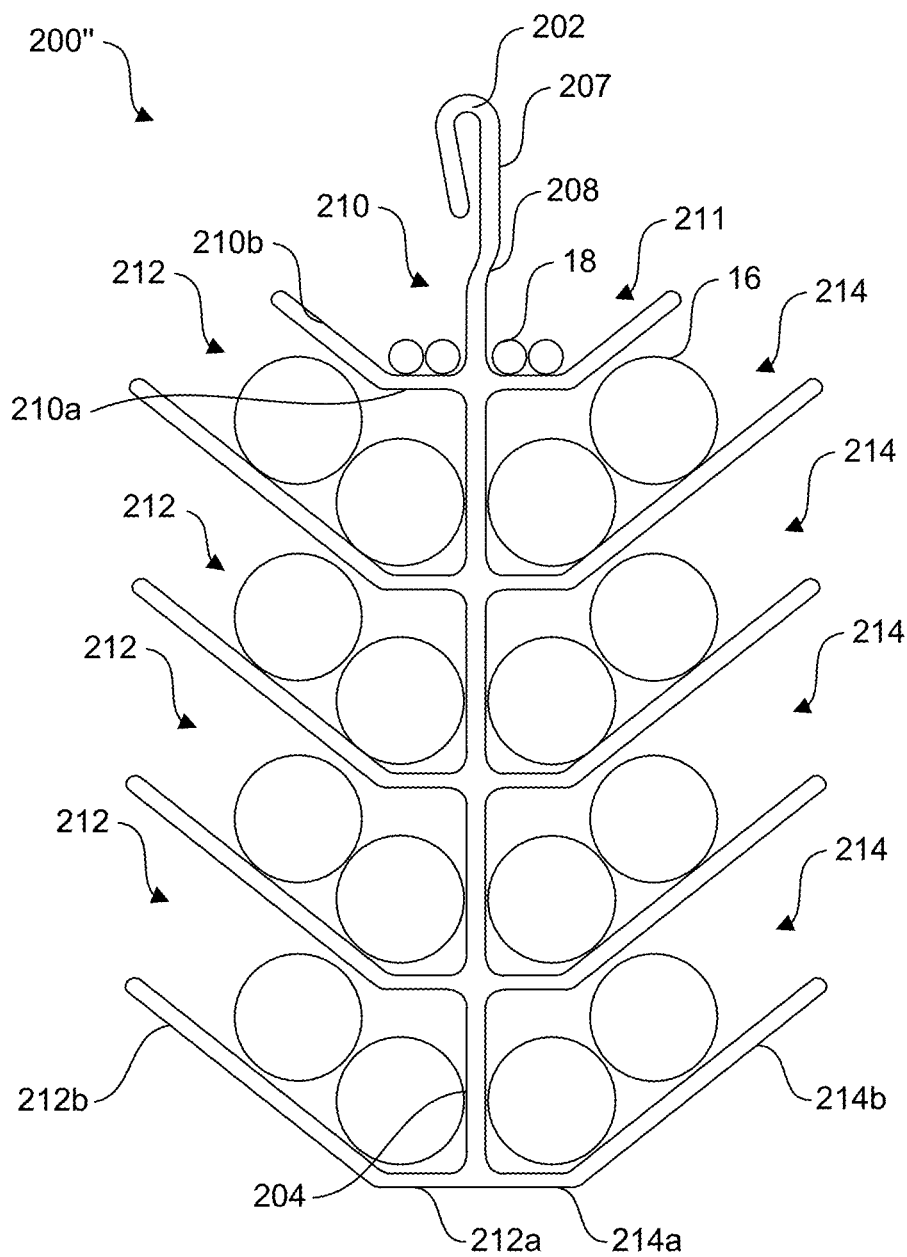
FIG. 3C is a front view of another implementation of a cable hanger.

FIGS. 3A-3C depict substantially similar cable hangers having different amounts of saddles. Cable hanger 200, illustrated in FIG. 3A, includes a hook 202 (illustrated in the crimped position), a center support member 204, a hook support leg 207, and an offset leg 208, similar to cable hanger 100. Additionally, cable hanger 200 includes saddles 210, 211, 212, and 214. Saddles 210 and 211 are arranged on opposite sides of the center support member 204 and proximal to the saddles 212, 214. Saddles 210, 211 are formed from extensions 210a, 210b, 211a, 211b, respectively, and are configured to support wires 18. In an exemplary implementation, the extensions 210a, 211a extend perpendicular from the center support member 204, with the extensions 210b, 211b extending at an angle from the extensions 210a, 211a. Additionally, saddles 212 and 214 are arranged distal to the saddles 210, 211, and are formed from extensions 212a, 212b, 214a, 214b, similar to the saddles 112, 114. The extensions 212a, 214a extend perpendicular from the center support member 204, with the extensions 212b, 214b extending at an angle from the extensions 212a, 214b. The saddles 212, 214 are configured to support cables 16. In addition to having an offset hook 102, such as cable hanger 100, the cable hanger 200 includes the secondary wire saddle 211, arranged opposite the saddle 210, and two levels each of saddles 212 and saddles 214 vertically aligned with one another. In this exemplary implementation, multiple levels of cables 16 can be supported by the cable hanger 200.

Similar to the cable hanger 200, cable hangers 200' and 200", depicted in FIGS. 3B-3C, respectively, include substantially identical components. However, the cable hanger 200' includes three levels of saddles 212, 214, and cable hanger 200" includes four levels of saddles 212, 214. By including multiple levels of saddles, the cable hangers are able to support more cables 16 while keeping the cables organized within the cable hangers. Even though only a maximum of four saddle levels is depicted, the maximum amount of levels of saddles available on a single cable hanger can be a greater amount of saddle levels than four levels.

Figure 3D:
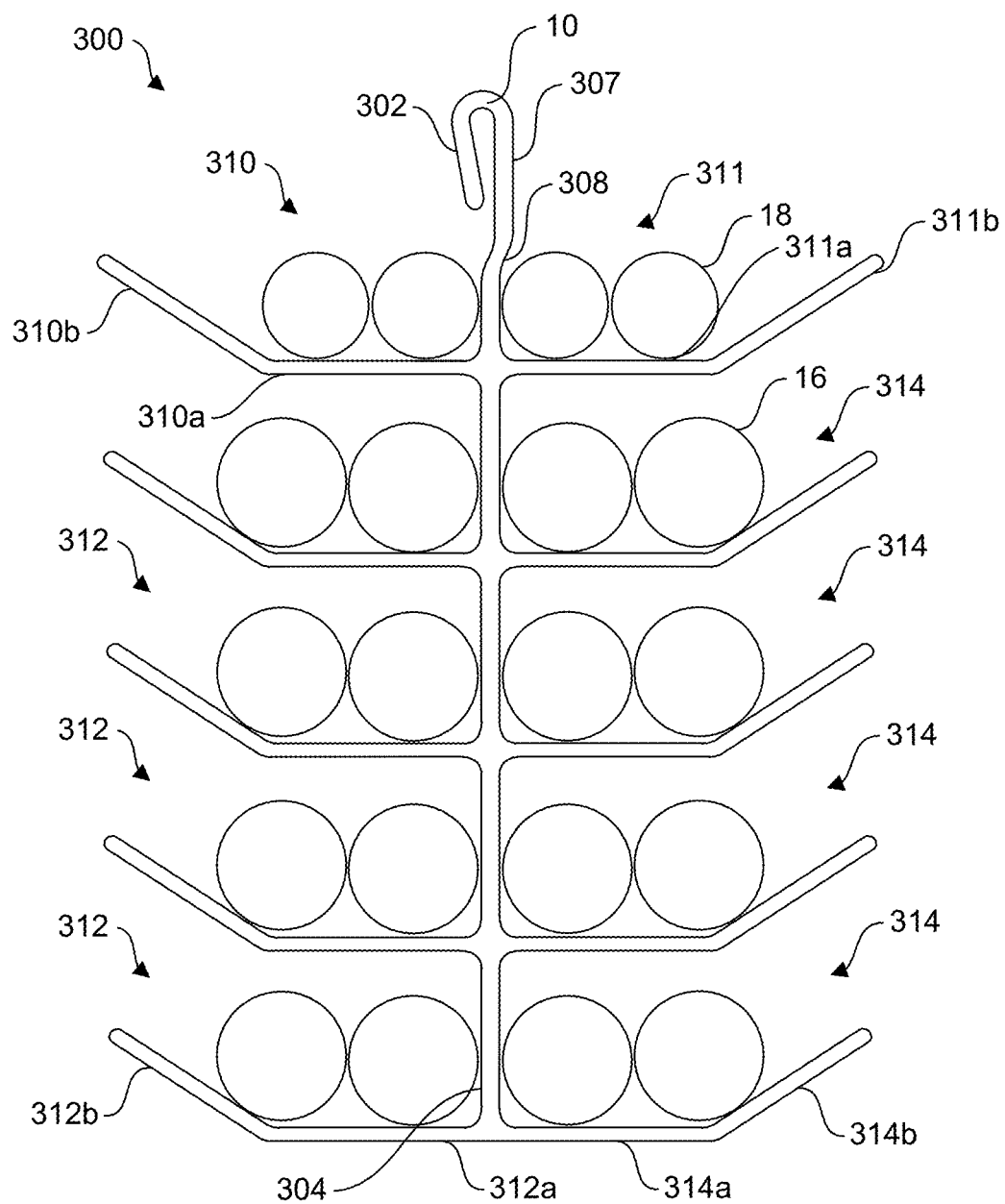
FIG. 3D is a front view of another implementation of a cable hanger.

In addition to having additional saddles on a single cable hanger, the saddles can also be different shapes. FIG. 3D depicts an exemplary implementation of a cable hanger 300. Similar to cable hangers 200, 200', 200", the cable hanger 300 includes a hook 302, a center support member 304, a hook support leg 307, and an offset leg 308. Additionally, cable hanger 300 includes saddles 310, 311, 312, and 314. Unlike the cable hangers 200, 200', 200", the saddles 310, 311 are substantially the same size as the saddles 312, 314. Additionally, the saddles 310, 311 are formed from extensions 310a, 310b, 311a, 311b, with the extensions 310a, 311a extending perpendicular from the center support member 304 to a length large enough to keep the wires 18 arranged within the saddles 310, 311 aligned with one another perpendicular to the center support member 304. Additionally, the saddles 312, 314 are formed from extensions 312a, 312b, 314a, 314b, with the extensions 312a, 314a extending perpendicular from the center support member 304 to a length large enough to keep the cables 16 arranged within the saddles 312, 314 aligned with one another perpendicular to the center support member 304.

Figure 4:
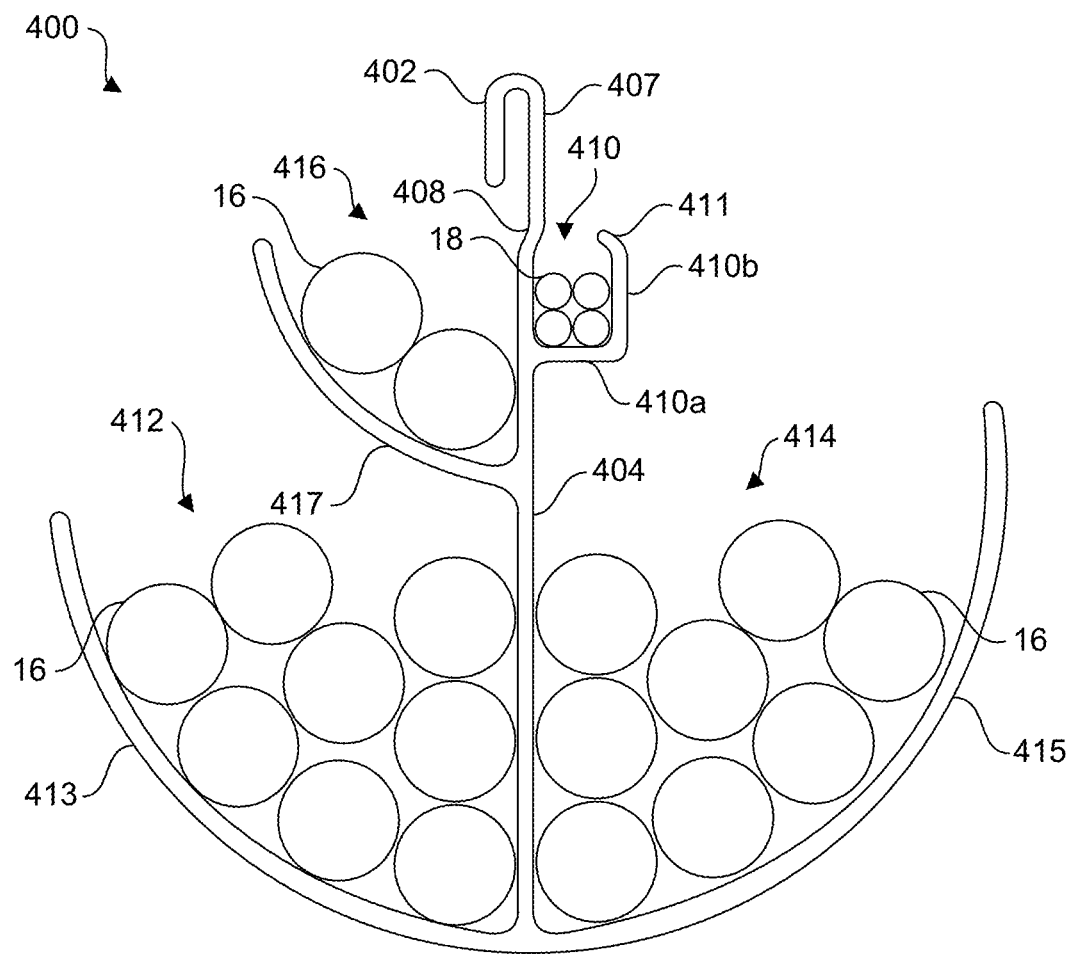
FIG. 4 is a front view of another implementation of a cable hanger.

In addition to saddles having extensions of different lengths, the extensions can also be curved in certain implementations. FIG. 4 depicts a cable hanger 400 having a hook 402, a center support member 404, a hook support leg 407, and an offset leg 408, similar to the cable hanger 100. The cable hanger 400 also includes saddles 410, 412, 414, 416 arranged on the center support member 404. The saddle 410 is formed from extensions 410a, 410b, and a slanted end 411, where the extension 410a is perpendicular to the center support member 404, and the extension 410b is parallel to the center support member 404. Unlike the saddle 410, the saddles 412, 414, 416 are formed from a single curved extension. The saddle 412 includes a curved extension 413, the saddle 414 includes a curved extension 415, and the saddle 416 includes a curved extension 417. The curved extensions forming the saddles can reduce the surface area of the saddles, which would allow for less material to be used in the manufacturing of the cable hanger 400, while also keeping a similar volume within each saddle to support cables 16 and/or wires 18.

Figure 5:
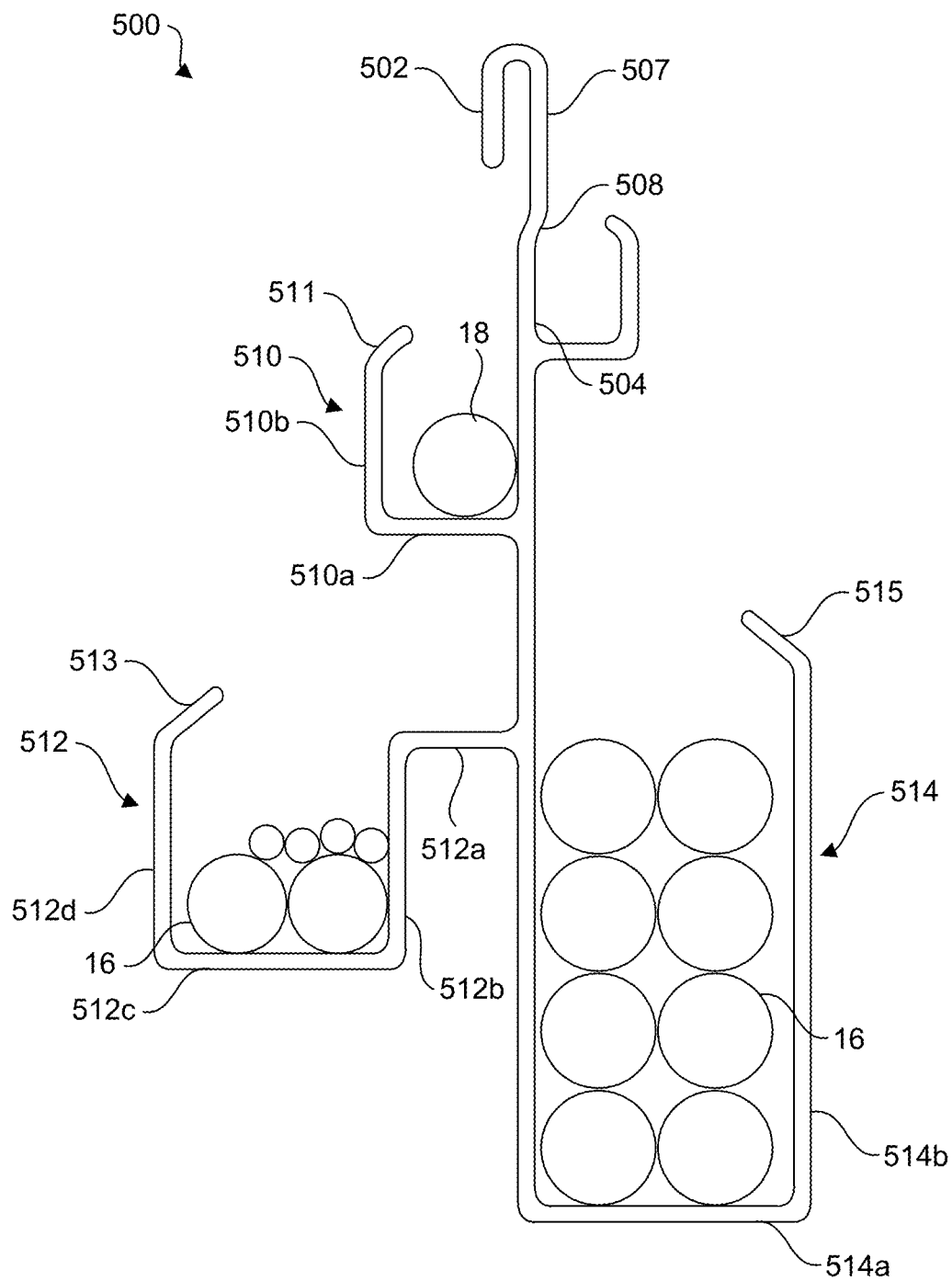
FIG. 5 is a front view of another implementation of a cable hanger.

As stated previously, the saddles of a cable hanger can be different shapes. FIG. 5 depicts a cable hanger 500 having different shaped saddles. Similar to the cable hanger 100, the cable hanger 500 includes a hook 502, a center support member 504, a hook support leg 507, and an offset leg 508. The cable hanger 500 also includes saddles 510, 512, 514, with each saddle being a different shape. In an exemplary implementation, the saddle 510 is formed from extensions 510a, 510b, and a slanted end 511, where the extension 510a is perpendicular to the center support member 504, and the extension 510b is parallel to the center support member 504.

The saddle 510 may be configured to only support a single cable 16 or wire 18. Similar to the saddle 510, the saddle 514 is formed from extensions 514a, 514b, and a slanted end 515, where the extension 514a is perpendicular to the center support member 504, and the extension 514b is parallel to the center support member 504. In addition to the saddles 510, 514, the saddle 512 is arranged on the center support member 504 opposite the saddle 514. The saddle 512 is configured to support cables 16 and wires 18, while also offsetting the weight of the cables 16 arranged within the saddle 514. In order to offset the weight to prevent rotation of the cable hanger 500, the saddle 512 includes extensions 512a, 512b, 512c, 512d, and a slanted end 513. The saddle 513 is offset perpendicular from the center support member 504 by the extension 512a, with the extension 512b, 512c, and 512d forming the channel of the saddle 512 for the cables 16 to be arranged therein. The overall design of the cable hanger 500 is able to remain balanced while also having a majority of cables 16 on a single side of the cable hanger 500, in addition, the design allows for separating different cable/wire types for various cable spacing requirements.

Figure 6:
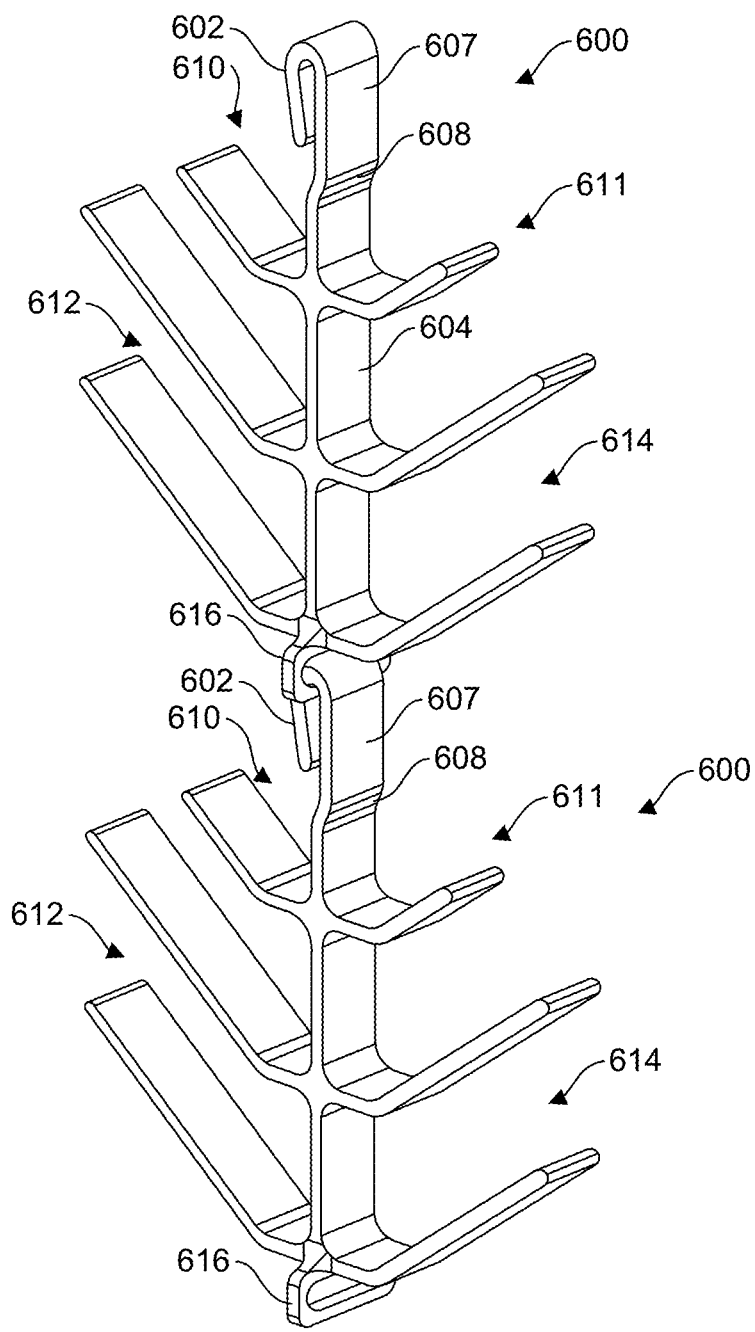
FIG. 6 is a front perspective view of another implementation of a cable hanger system.

Even though some exemplary implementations of cable hangers can include additional saddles, it may be advantageous to have cable hangers which can be connected to one another in order to increase the cable hanger system's capacity, which allows for additional cables/wires to be installed (in some cases, months or years) after the original cable hanger was installed, this may be advantageous for some installation or maintenance methodologies. FIG. 6 illustrates an exemplary implementation of cable hangers 600 which can be attached to one another. The cable hangers 600 are similar to the cable hanger 200, where the cable hangers 600 each include a hook 602, a center support member 604, a hook support leg 607, an offset leg 608, and saddles 610, 611, 612, 614. In addition to these components, the cable hangers 600 also include an attachment mechanism in the form of a loop 616. The loop 616 is arranged on the distal end of the cable hanger and is configured to allow another cable hanger to attach to the cable hanger 600. By attaching the cable hanger 600 together, the carrying capacity of the cable hangers can be increased to any amount by attaching more cable hangers 600 to one another. Due to the design, the cable hangers 600 are vertically aligned in order to keep balanced to prevent rotation. Additionally, the most proximally arranged cable hanger 600 is configured to be secured to a support wire by crimping the hook 602 on the support wire. The additional cable hangers 600 can also crimp their respective hooks 602 to the loop 616 of a proximally arranged cable hanger.

Figure 7:
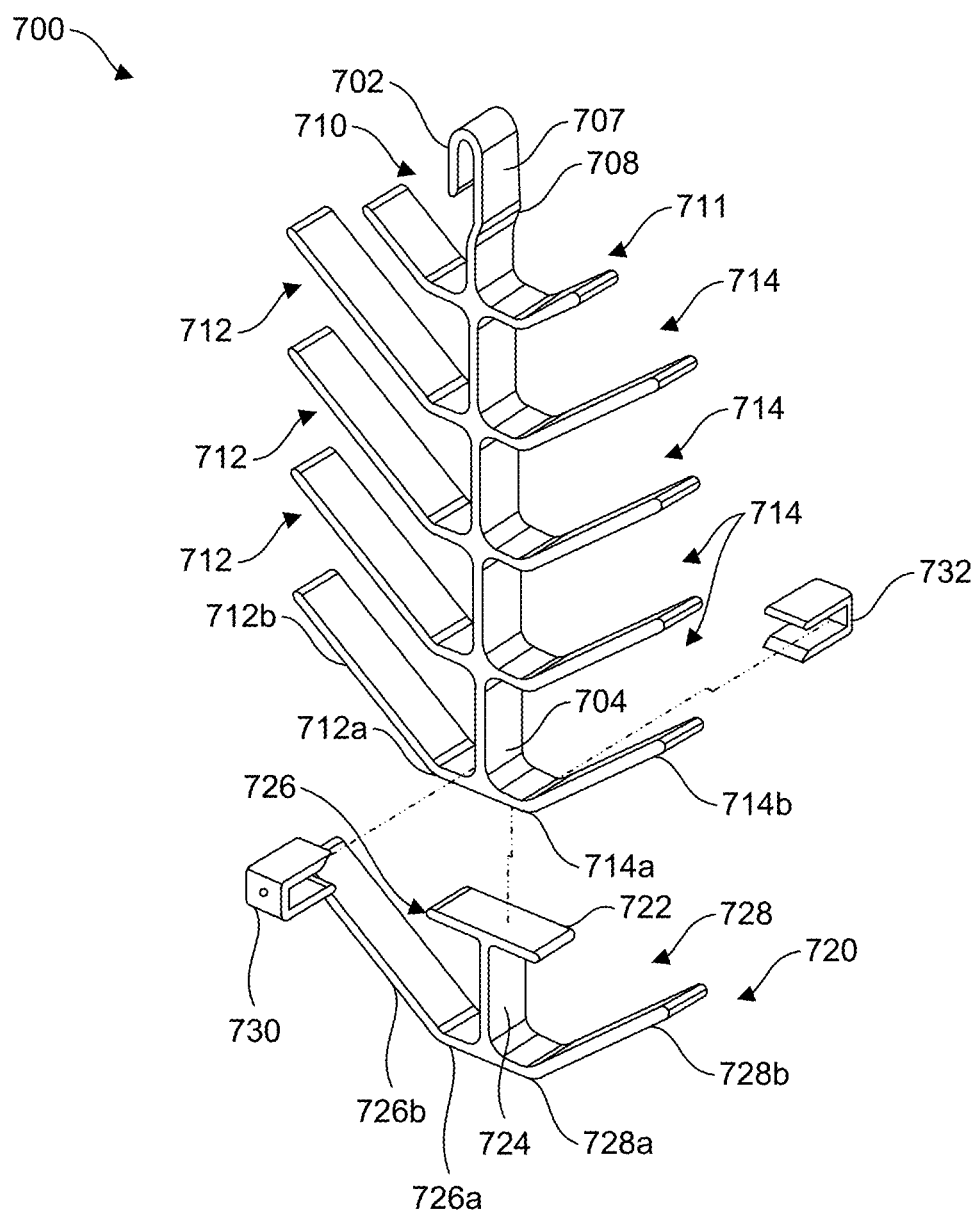
FIG. 7 is a front perspective view of another implementation of a cable hanger system.

FIG. 7 illustrates another exemplary implementation of a cable hanger 700 which can include additions 720 secured to the cable hanger 700. The cable hanger 700 is similar to the cable hanger 200", where the cable hanger 700 includes a hook 702, a center support member 704, a hook support leg 707, an offset leg 708, and saddles 710, 711, 712, 714. In addition to these components, the cable hanger 700 also include an addition 720. The addition 720 includes an attachment flange 722 arranged on the proximal end of a center support leg 724, forming a "T" shape with the center support leg 724. The addition 720 also includes saddles 726 and 728 arranged at the distal end of and on opposite sides of the center support leg 724. The saddle 726 is formed from extensions 726a, 726b, and the saddle 728 is formed from extensions 728a, 728b. In order to secure the addition 720 to the cable hanger 700, the attachment flange 722 abuts the extensions 712a, 712b of the cable hanger 700, and clips 730, 732 can be arranged to secure the cable hanger 700 to the addition 720. The clips 730, 732 can be slid onto the cable hanger 700 and addition 720 in opposite directions, and can be removable so that the cable hanger 700 can add or remove additions 720 as needed. By attaching the cable hanger 700 to the addition 720, the carrying capacity of the cable hanger 700 can be increased to any amount by attaching more additions 720 to one another. Due to the design, the cable hanger 700 and the addition 720 are vertically aligned in order to keep the assembly balanced to prevent rotation. In an exemplary implementation, more than one addition 720 can be secured to the cable hanger 700. The most proximal addition 720 is attached to the cable hanger 700, with each additional addition 720 being attached to the adjacent addition 720. For example, the attachment flange 722 of an addition 720 can abut the extensions 726a, 728a of a proximally arranged addition 720, with additional clips 730, 732 securing the proximally arranged addition 720 to the distally arranged addition 720. This process can be repeated in order to add additional saddles to the assembly.

Figure 8:
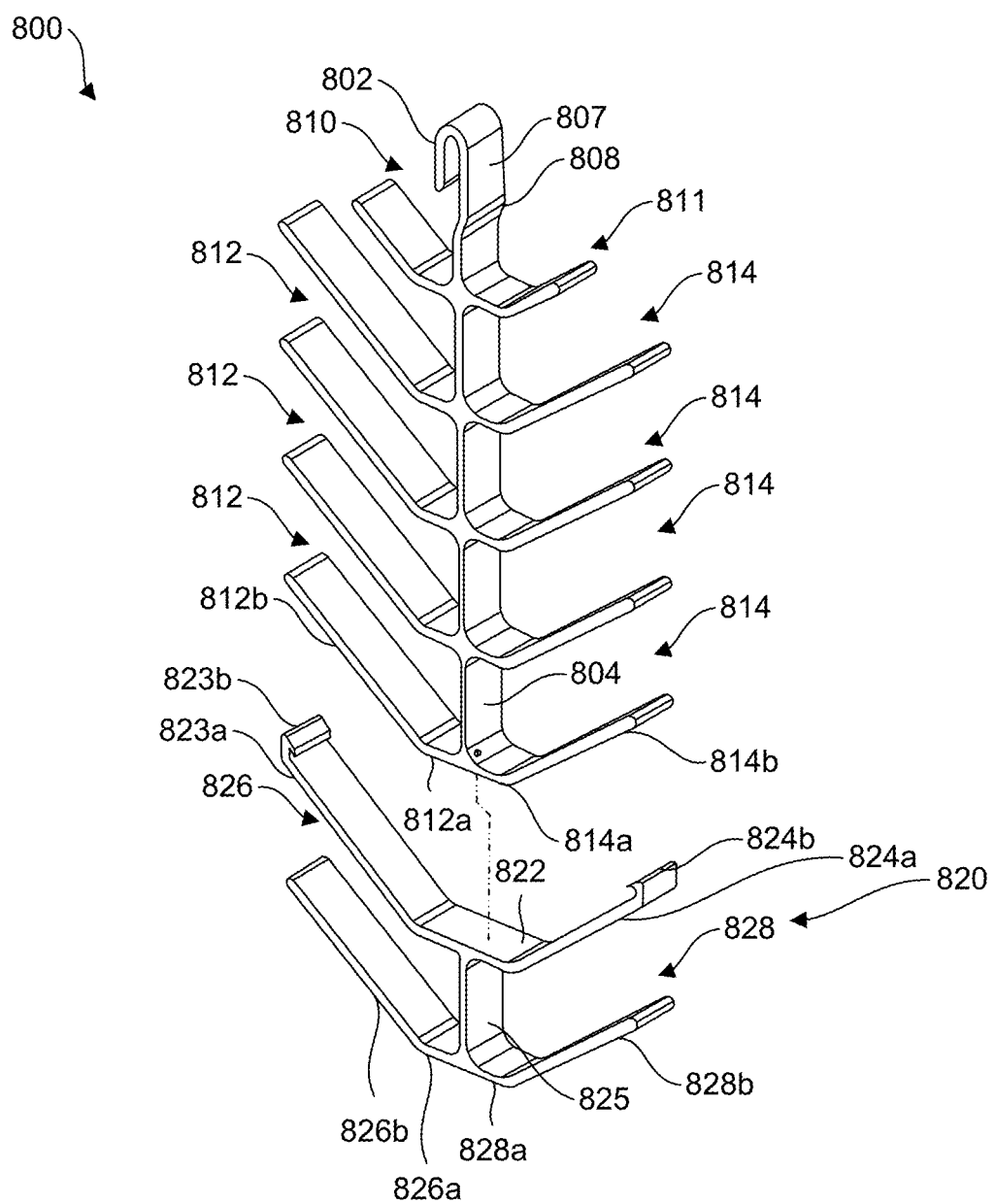
FIG. 8 is a front perspective view of another implementation of a cable hanger system.

FIG. 8 illustrates another exemplary implementation of a cable hanger 800 which can include additions 820 secured to the cable hanger 800. The cable hanger 800 is similar to the cable hanger 700, where the cable hanger 800 includes a hook 802, a center support member 804, a hook support leg 807, an offset leg 808, and saddles 810, 811, 812, 814. In addition to these components, the cable hanger 800 also includes an addition 820. The addition 820 includes an attachment flange 822 arranged on the proximal end of a center support leg 825, and includes extensions 823a, 824a. Arranged on the end of each extension 823a, 824a is a tab 823b, 824b which can flex and deform in order to secure the addition 820 to the cable hanger 800. Similar to the addition 720, the addition 820 also includes saddles 826 and 828 arranged at the distal end of and on opposite sides of the center support leg 824. The saddle 826 is formed from extensions 826a, 826b, and the saddle 828 is formed from extensions 828a, 828b.

The extensions 823a, 824a are substantially similar in shape to the extensions 812b, 814b of the saddles 812, 814 of the cable hanger 800, such that when the attachment flange 822 abuts the extension 812a, 814a, and the extensions 823a, 824a abut the extensions 812b, 814b, the tabs 823b, 824b will extend over the edges of the extensions 812b, 814b, securing the addition 820 to the cable hanger 800. The additions 820 can be removable so that the cable hanger 800 can add or remove additions 820 as needed. By attaching the cable hanger 800 to the addition 820, the carrying capacity of the cable hanger 800 can be increased to any amount by attaching more additions 820 to one another. Due to the design, the cable hanger 800 and the addition 820 are vertically aligned in order to keep the assembly balanced to prevent rotation. In an exemplary implementation, more than one addition 820 can be secured to the cable hanger 800. The most proximal addition 820 can be attached to the cable hanger 800, with each additional addition 820 being attached to the adjacent addition 820. For example, the attachment flange 822 of an addition 820 can abut the extensions 826a, 828a of a proximally arranged addition 820, with the tabs 823b, 824b securing the proximally arranged addition 820 to the distally arranged addition 820. This process can be repeated in order to add additional saddles to the assembly.

Figure 9:
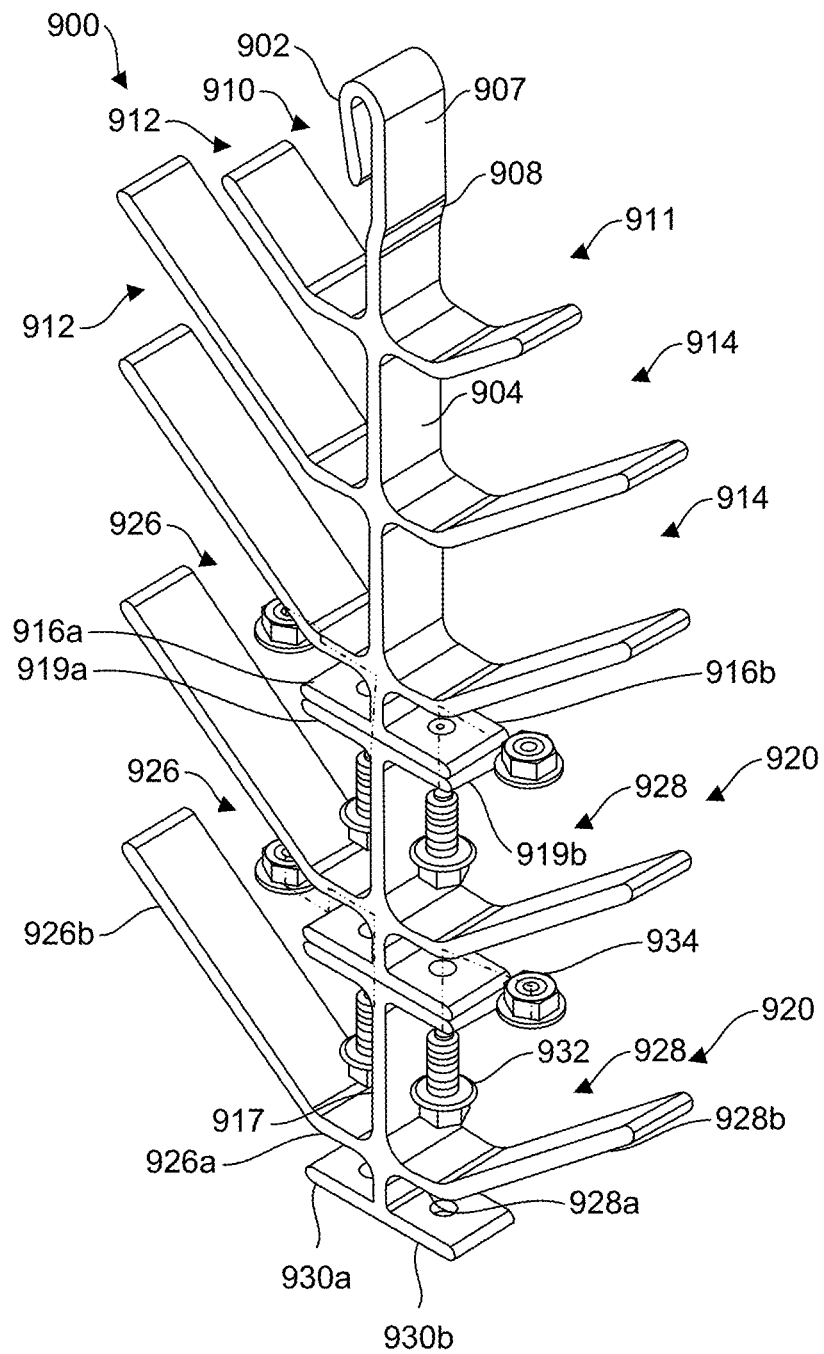
FIG. 9 is a front perspective view of another implementation of a cable hanger system.

FIG. 9 illustrates another exemplary implementation of a cable hanger 900 which can include additions 920 secured to the cable hanger 900. The cable hanger 900 is similar to the cable hanger 700, where the cable hanger 900 includes a hook 902, a center support member 904, a hook support leg 907, an offset leg 908, and saddles 910, 911, 912, 914. In addition to these components, the cable hanger 900 also includes attachment flanges 916a, 916b extending perpendicular from the center support member 904 at the distal end of the center support member 904. The attachment flanges 916a, 916b can include apertures therein for securing the cable hanger 900 to an addition 920.

The addition 920 includes a center support leg 917, saddles 926, 928, proximal attachment flanges 919a, 919b, and distal attachment flanges 930a, 930b. The saddle 926 is formed from extensions 926a, 926b, and the saddle 928 is formed from extensions 928a, 928b. The proximal attachment flanges 919a, 919b are arranged on the proximal end of the center support leg 917, with the distal attachment flanges 930a, 930b arranged on the distal end of the center support leg 917. The attachment flanges 919a, 919b, 930a, 930b each include an aperture arranged therein and are configured to align such that bolts 932 can be arranged within the apertures and secured within nuts 934. The most proximal addition 920 is attached to the cable hanger by passing a bolt 932 through the apertures of the attachment flanges 916a, 916b of the cable hanger 900 and the apertures of the attachment flanges 919a, 919b of the addition 920.

The additions 920 can be removable so that the cable hanger 900 can add or remove additions 920 as needed. By attaching the cable hanger 900 to the addition 920, the carrying capacity of the cable hanger 900 can be increased to any amount by attaching more additions 920 to one another. Due to the design, the cable hanger 900 and the additions 920 are vertically aligned in order to keep the assembly balanced to prevent rotation. In an exemplary implementation, more than one addition 920 can be secured to the cable hanger 900. As stated above, the most proximal addition 920 can be attached to the cable hanger 900, with each additional addition 920 being attached to the adjacent addition 920. For example, the attachment flanges 919a, 919b of an addition 920 can abut the attachment flanges 930a, 930b of a proximally arranged addition 920, with bolts 932 passing through the apertures in order to secure the proximally arranged addition 920 to the distally arranged addition 920.

Figure 10:
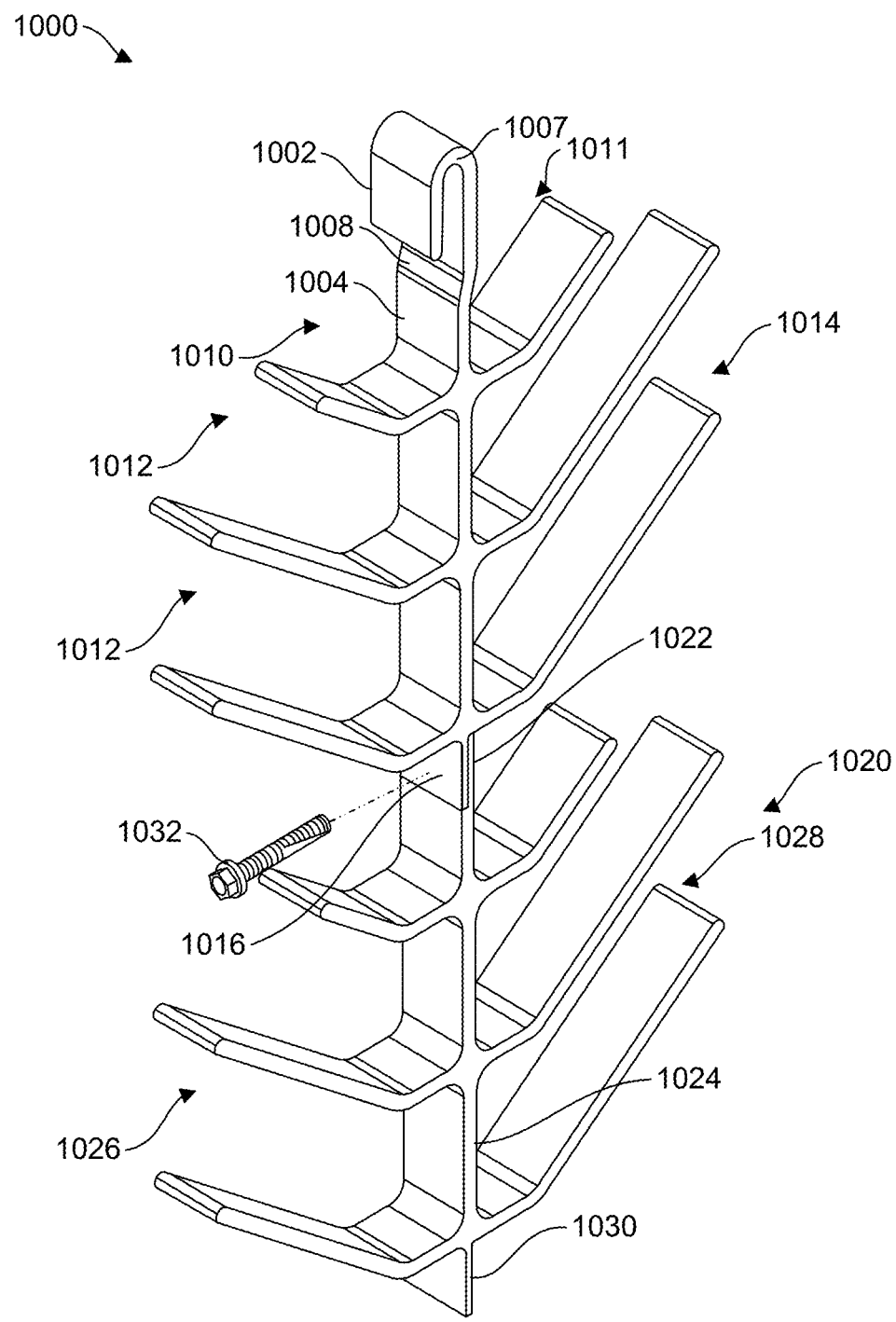
FIG. 10 is a front perspective view of another implementation of a cable hanger system.

FIG. 10 illustrates another exemplary implementation of a cable hanger 1000 which can include additions 1020 secured to the cable hanger 1000. The cable hanger 1000 is similar to the cable hanger 700, where the cable hanger 1000 includes a hook 1002, a center support member 1004, a hook support leg 1007, an offset leg 1008, and saddles 1010, 1011, 1012, 1014. In addition to these components, the cable hanger 1000 also includes attachment flanges 1016 extending distally from the center support member 1004 at the distal end of the center support member 1004.

The addition 1020 is similar to the cable hanger 1000 and includes a center support leg 1024 and saddles 1026, 1028. The saddle 1026 is formed from extensions 1026a, 1026b, and the saddle 1028 is formed from extensions 1028a, 1028b. The addition also include a proximal attachment flange 1022 arranged on the proximal end of the center support leg 1024, and a distal attachment flange 1030 arranged on the distal end of the center support leg 1024. The attachment flanges 1022, 1030 extend from the center support leg 1024 and are configured to secure the addition 1020 to a cable hanger 1000, or an addition 1020 to another addition.

In order to secure an addition 1020 to a cable hanger 1000, the attachment flanges 1016 and 1022 are aligned such that the flanges overlap in the vertical direction. A screw 1032 is driven through the attachment flanges 1016, 1022 in order to secure the cable hanger 1000 to the addition 1020. Additionally, another addition 1020 can be secured to the addition 1020 by driving a screw 1032 through the aligned attachment flange 1022 of a proximally arranged addition 1020 with an attachment flange 1030 of a distally arranged addition 1020.

Figure 11:
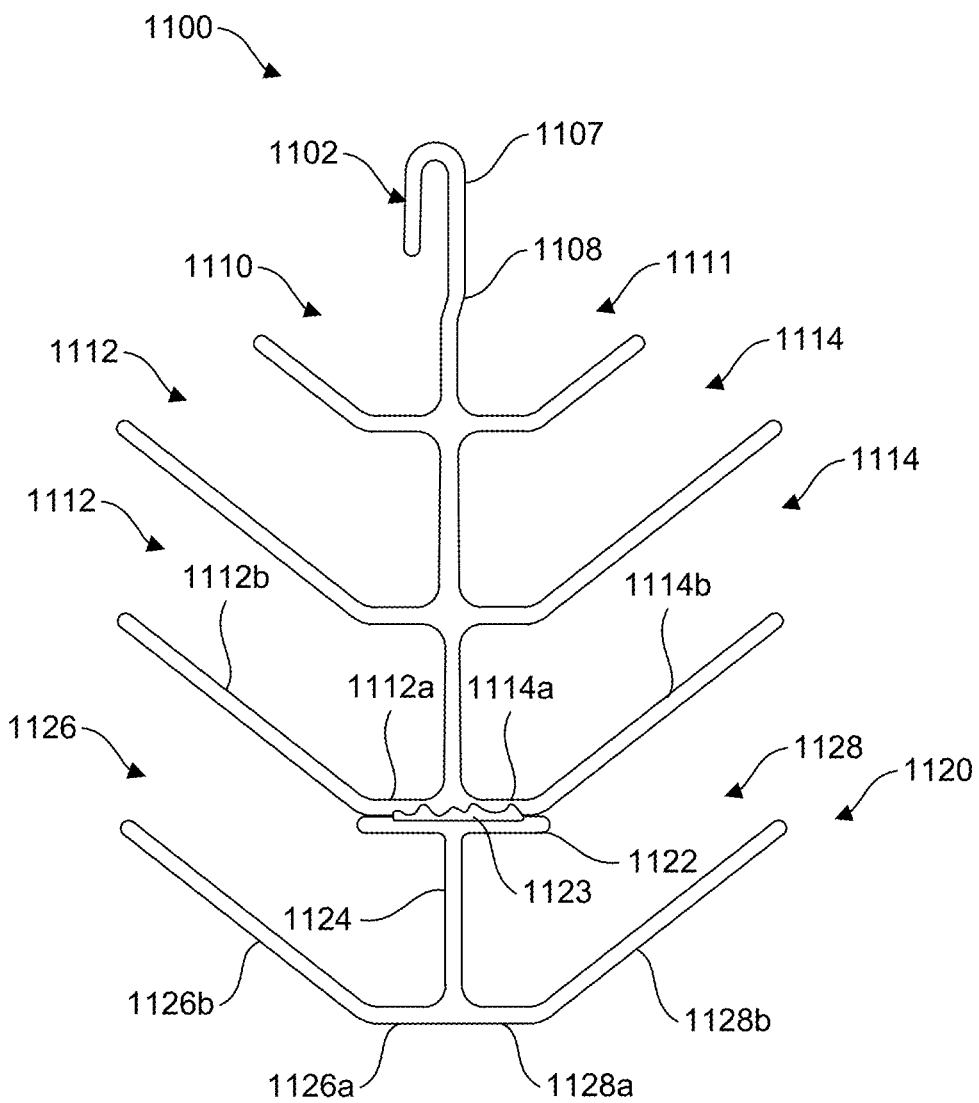
FIG. 11 is a front perspective view of another implementation of a cable hanger system.

FIG. 11 illustrates another exemplary implementation of a cable hanger 1100 which can include additions 1120 secured to the cable hanger 1100. The cable hanger 1100 is similar to the cable hanger 700, and the addition 1120 is similar to the addition 720. The cable hanger 1100 includes a hook 1102, a center support member 1104, a hook support leg 1107, an offset leg 1108, and saddles 1110, 1111, 1112, 1114. The addition 1120 includes an attachment flange 1122 arranged on the proximal end of a center support leg 1124, forming a "T" shape with the center support leg 1124. The addition 1120 also includes saddles 1126 and 1128 arranged at the distal end of and on opposite sides of the center support leg 1124. The saddle 1126 is formed from extensions 1126*a*, 1126*b*, and the saddle 1128 is formed from extensions 1128*a*, 1128*b*. In order to secure the addition 1120 to the cable hanger 1100, the attachment flange 1122 abuts the extensions 1112*a*, 1114*a* of the cable hanger 1100, with an adhesive 1123 arranged between therebetween. In an exemplary implementation, the adhesive can be an adhesive tape, epoxy, or welded material.

In an exemplary implementation, more than one addition 1120 can be secured to the cable hanger 1100. The most proximal addition 1120 can be attached to the cable hanger 1100, with each additional addition 1120 being attached to the adjacent addition 1120 using the adhesive 1123. For example, the attachment flange 1122 of an addition 1120 can abut the extensions 1126*a*, 1128*a* of a proximally arranged addition 1120, with adhesive 1123 arranged therebetween.

Figure 12:
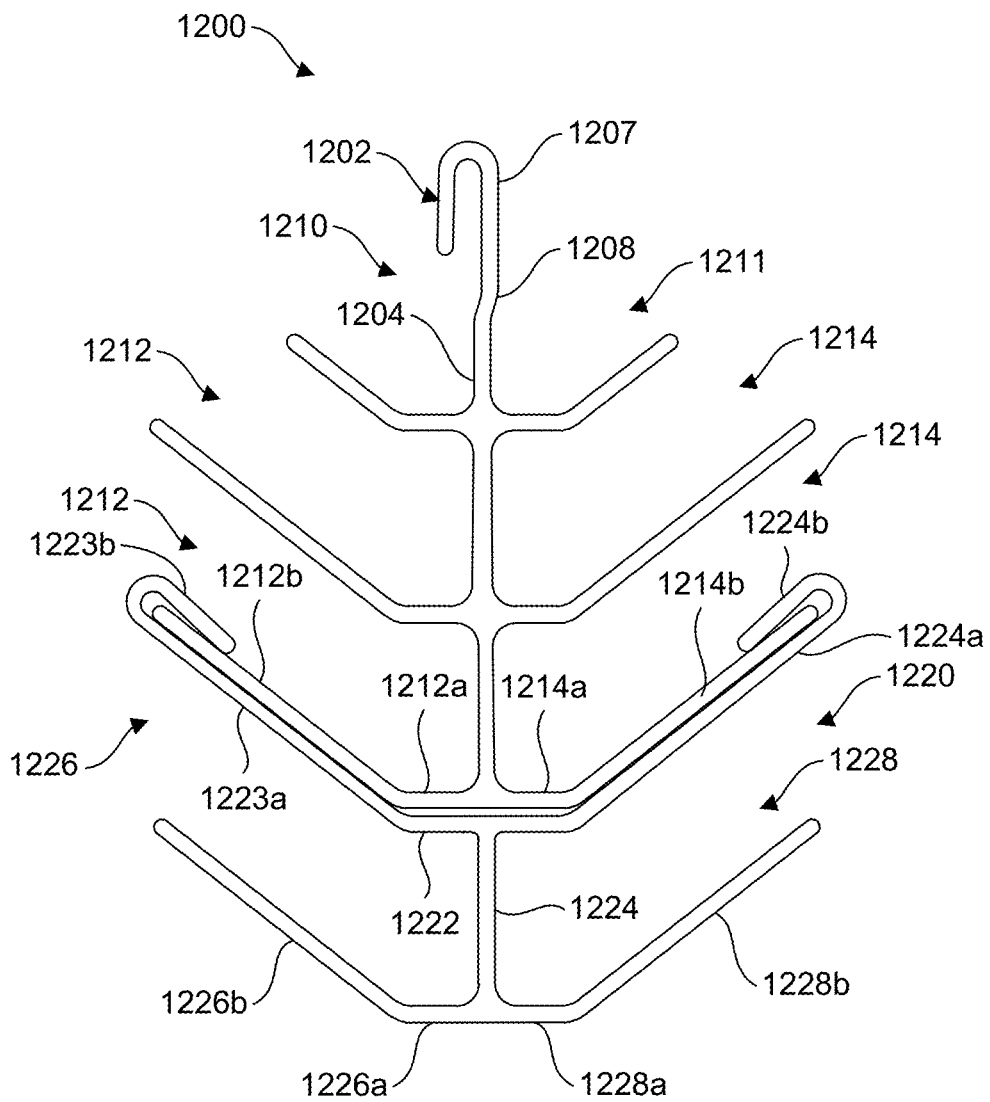
FIG. 12 is a front perspective view of another implementation of a cable hanger system.

FIG. 12 illustrates another exemplary implementation of a cable hanger 1200 which can include additions 1220 secured to the cable hanger 1200. The cable hanger 1200 is similar to the cable hanger 1200, and the addition 1220 is similar to the addition 820. The cable hanger 1200 includes a hook 1202, a center support member 1204, a hook support leg 1207, an offset leg 1208, and saddles 1210, 1211, 1212, 1214. Similar to the addition 820, the addition 1220 includes saddles 1226 and 1228 arranged at the distal end of and on opposite sides of the center support leg 1224. The saddle 1226 is formed from extensions 1226*a*, 1226*b*, and the saddle 1228 is formed from extensions 1228*a*, 1228*b*.

The addition 1220 also includes an attachment flange 1222 arranged on the proximal end of a center support leg 1224, and includes extensions 1223*a*, 1224*a*. Arranged on the end of each extension 1223*a*, 1224*a* is a deformable tab 1223*b*, 1224*b* which can deform in order to secure the addition 1220 to the cable hanger 1200. The deformable tabs 1223*b*, 1224*b* are similar to the hook 1202, and are crimped in a similar procedure to secure the addition 1220 to the cable hanger 1200. The extensions 1223*a*, 1224*a* are substantially similar in shape to the extensions 1212*b*, 1214*b* of the saddles 1212, 1214 of the cable hanger 1200, such that when the attachment flange 1222 abuts the extensions 1212*a*, 1214*a*, and the extensions 1223*a*, 1224*a* abut the extensions 1212*b*, 1214*b*, the tabs 1223*b*, 1224*b* can be crimped over the edges of the extensions 1212*b*, 1214*b*, securing the addition 1220 to the cable hanger 1200. In an exemplary implementation, more than one addition 1220 can be secured to the cable hanger 1200. The most proximal addition 1220 can be attached to the cable hanger 1200, with each additional addition 1220 being attached to the adjacent addition 1220. For example, the attachment flange 1222 of an addition 1220 can abut the extensions 1226*a*, 1228*a* of a proximally arranged addition 1220, with the tabs 1223*b*, 1224*b* securing the proximally arranged addition 1220 to the distally arranged addition 1220.

Figure 13A:
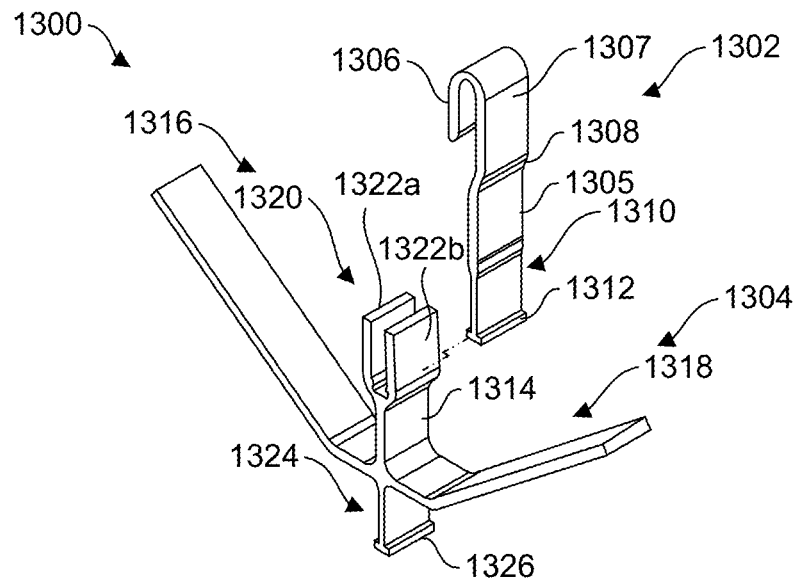
FIG. 13 is a front perspective view of another implementation of a cable hanger system.

As stated previously, cable hangers can include extensions which are secured to the cable hanger already having multiple saddles. Additionally, a cable hanger can be formed from a hook portion and multiple saddles secured to the hook portion. FIG. 13A illustrates another exemplary implementation of a cable hanger 1300 including a hook portion 1302 and additions 1304. When assembled, the cable hanger 1300 is similar to the cable hanger 200, having a hook securing the cable hanger to a support wire and saddles for supporting cables. The addition 1304 is similar to the addition 1220. The design of the cable hanger 1300 can allow for individual saddles to be added to the cable hanger to ensure there are no empty saddles on the cable hanger 1300 while in use.

The addition 1320 also includes an attachment flange 1326 arranged on the distal end of a center support leg 131, where the attachment flange 1326 is substantially identical to the flange 1312 of the hook portion 1302. In an exemplary implementation, more than one addition 1304 can be secured to the cable hanger 1300. The most proximal addition 1304 can be attached to the hook portion 1302, with each additional addition 1304 being attached to the adjacent addition 1304. For example, the attachment flange 1326 of an addition 1304 can slide into the gap formed between the tabs 1322*a*, 1322*b* of a proximally arranged addition 1304. The tabs can be deformed to secure the flange 1326 within the gap between the tabs 1322*a*, 1322*b*, thereby securing the proximally arranged addition 1304 to the distally arranged addition 1304.

Figure 13B:
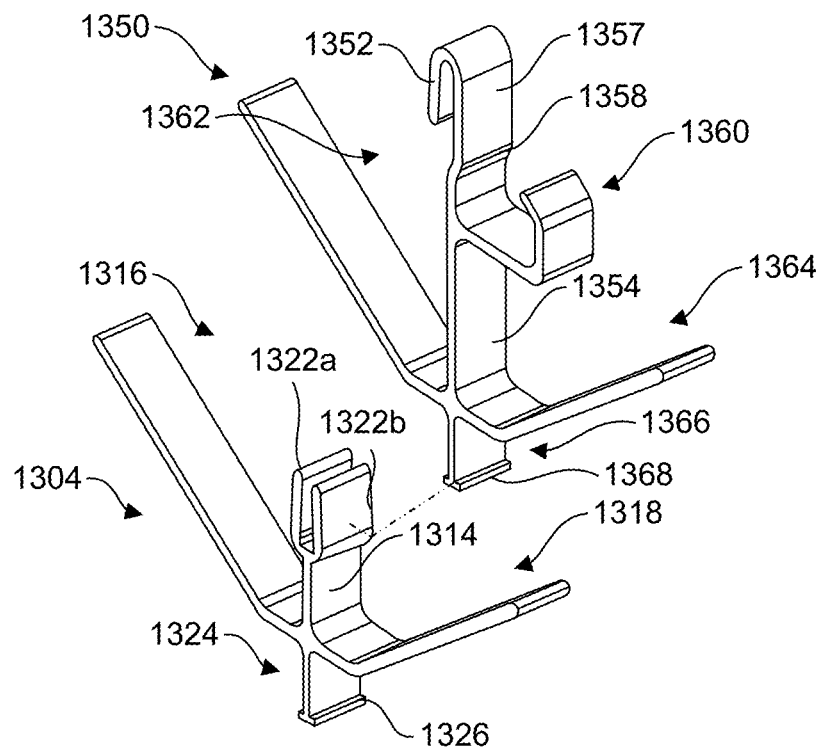

FIG. 13B illustrates the addition 1304 being used with a cable hanger 1350, which already include saddles. The cable hanger 1350 is similar to the cable hanger 100, and includes a hook 1352, a center support member 1354, a hook support leg 1357, an offset leg 1358, saddles 1360, 1362, 1364, and an attachment portion 1366 having a flange 1368. The attachment portion 1366 is identical to the attachment portion 1324, and the flange 1368 is arranged within the tabs 1322*a*, 1322*b* of the addition 1304, which can be deformed around the flange 1368 in order to secure the addition 1304 to the cable hanger 1350.

Figure 14:
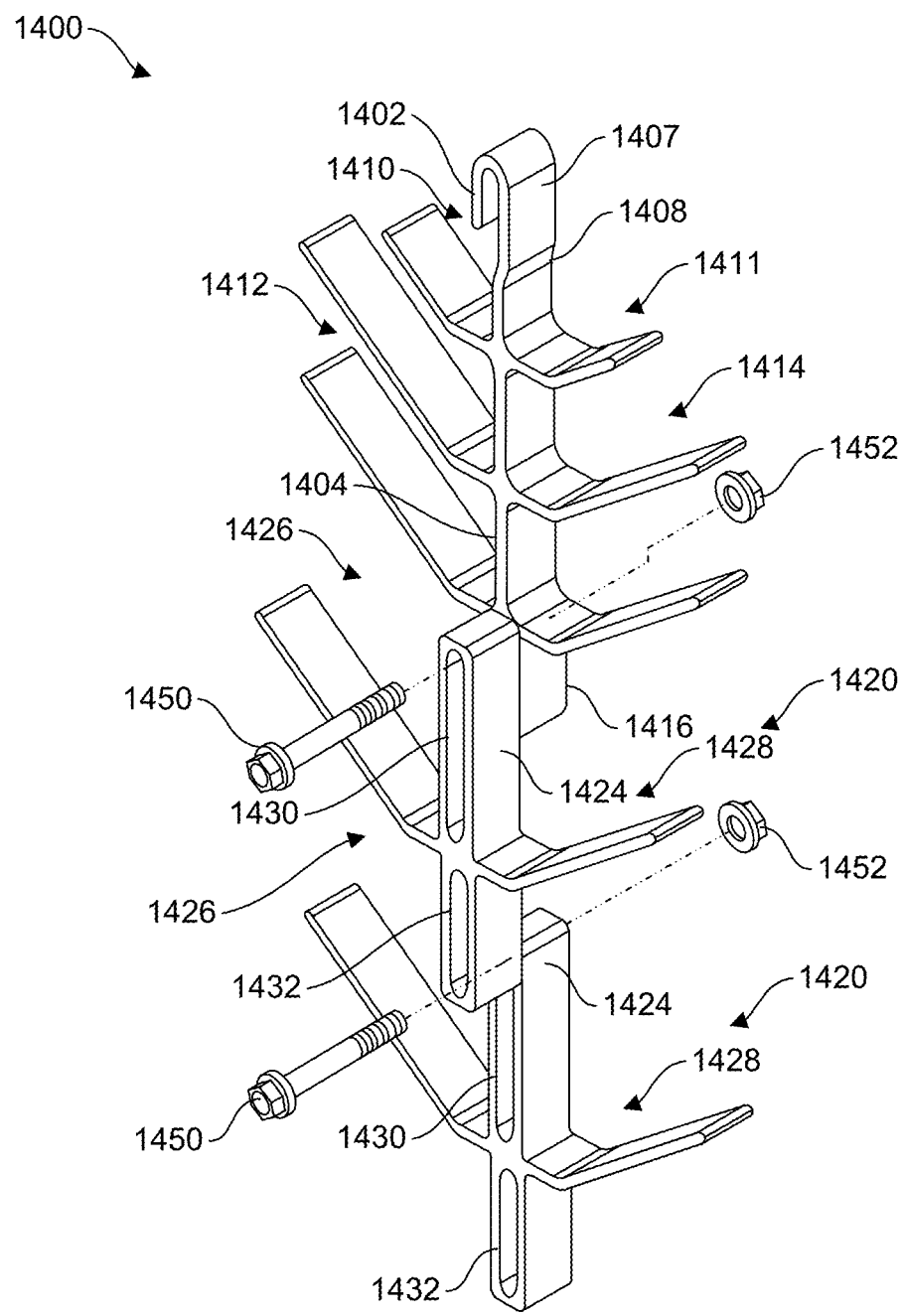
FIG. 14 is a front perspective view of another implementation of a cable hanger system.

Even though some exemplary implementations of cable hangers can include additional saddles, it may be advantageous to have cable hangers which can be connected to one another in order to increase the cable hanger system's capacity. FIG. 14 illustrates another exemplary implementation of a cable hanger 1400 which can include additions 1420 secured to the cable hanger 1400. The cable hanger 1400 is similar to the cable hanger 600, where the cable hanger 1400 includes a hook 1402, a center support member 1404, a hook support leg 1407, an offset leg 1408, and saddles 1410, 1411, 1412, 1414. In addition to these components, the cable hanger 1400 also includes an attachment flange 1416 extending distally from the center support member 1404 at the distal end of the center support member 1404. The attachment flange 1416 can include a slot (not shown) therein for securing the cable hanger 1400 to an addition 1420.

The addition 1420 includes a center support leg 1424 and saddles 1426, 1428. Additionally, the center support leg 1424 includes a proximal slot 1430 and a distal slot 1432 arranged therein. The slots 1430, 1432 are configured to align with the slots of the attachment flange 1416 and/or the slots 1430, 1432 of adjacent additions 1420 such that bolts 1450 can be arranged within the slots and secured with nuts 1452. The most proximal addition 1420 is attached to the cable hanger 1400 by passing a bolt 1450 through the slot of the attachment flange 1416 of the cable hanger 1400 and the proximal slot 1430 of the addition 1420. Additionally, the distal slot 1432 of an addition 1420 can align with the proximal slot 1430 of a proximally arranged addition 1420, with a bolt 1450 passing through the aligned slots 1430, 1432 in order to secure the proximally arranged addition 1420 to the distally arranged addition 1420. By having slots 1430, 1432 arranged vertically on the center support leg 1424, the depth of each saddle 1426, 1428 can be adjusted by sliding the addition 1420 relative to the cable hanger 1400 and/or an adjacent addition 1420.

Figure 15A:
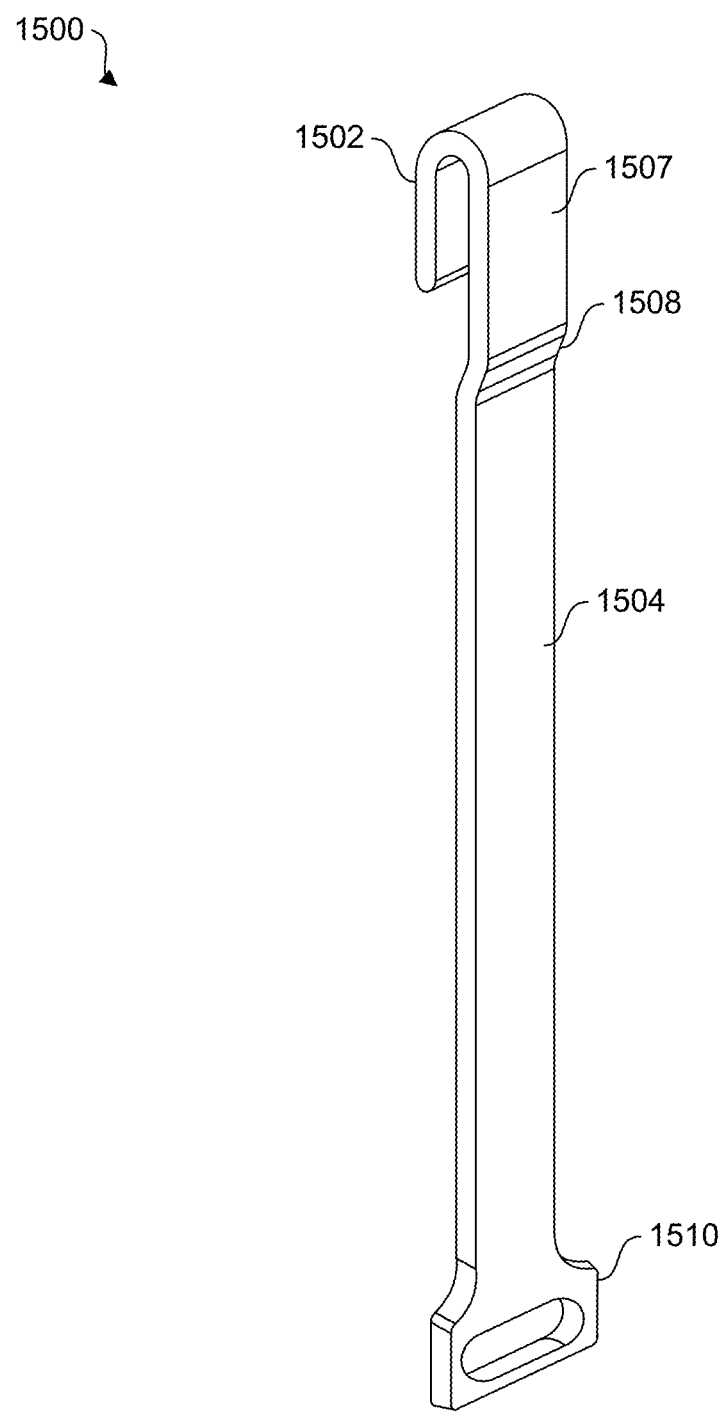
FIG. 15A is a front perspective view of an implementation of an extension bar of a cable hanger system.
Figure 15B:
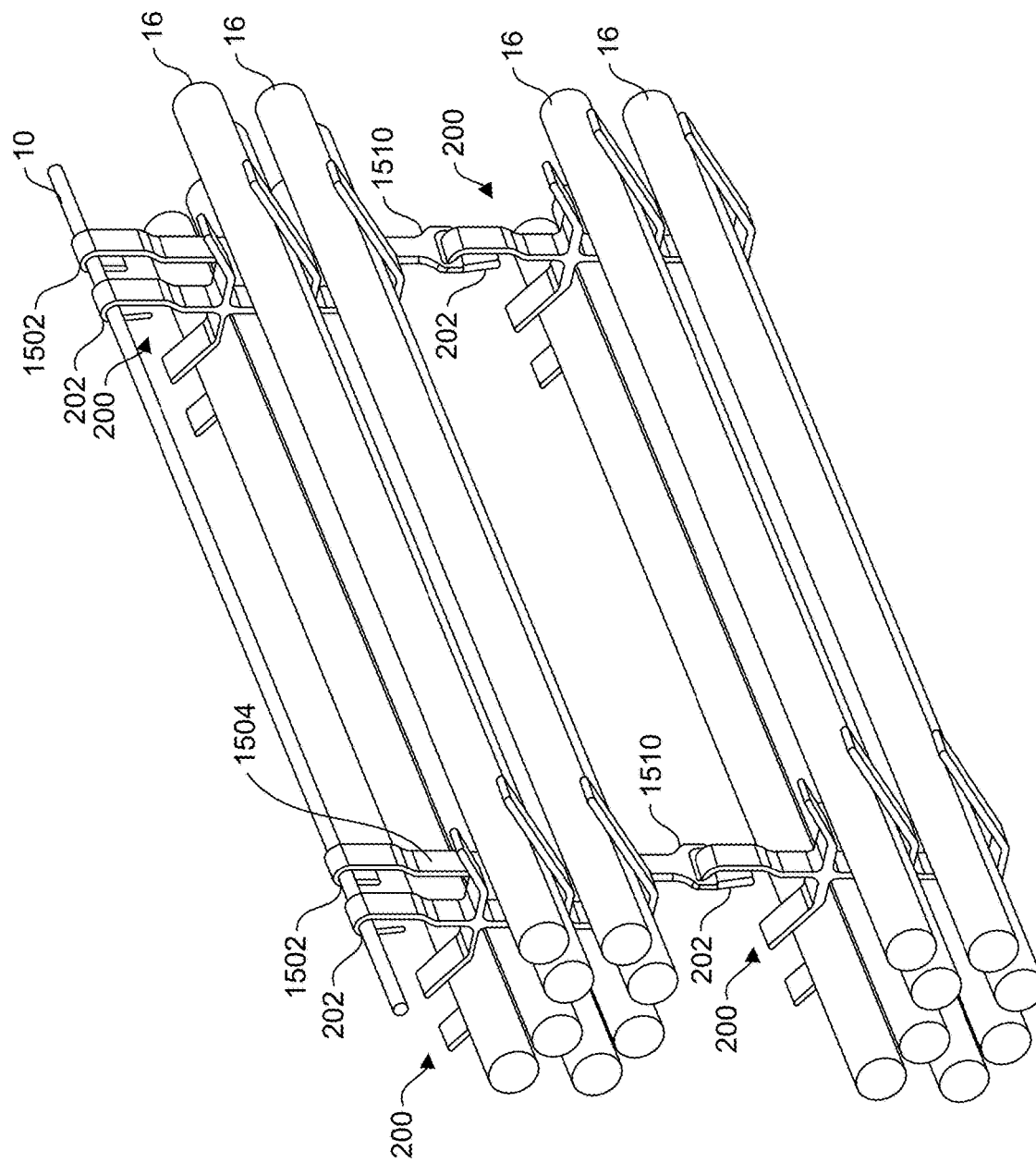
FIG. 15B is a front perspective view of an implementation of a cable hanger system having the extension bar of FIG. 15A.

As stated previously, multiple exemplary implementations of cable hangers can include attachment mechanisms in order to secure multiple cable hangers or additions in vertically alignment on a support wire. However, some exemplary implementations can include multiple vertically aligned cable hangers, which each secure to the support wire separately to avoid additional strain on a single hook of a cable hanger. FIGS. 15A-15B illustrate a cable hanger system including spacer hangers 1500 in order to vertically align cable hangers 200 on a support wire 10. The spacer hanger 1500 includes a hook 1502, a center support leg 1504, a hook support leg 1507, an offset leg 1508, and an attachment loop 1510. The attachment loop 1510 is arranged at the distal end of the center support leg, and is similar to the loop 616 of the cable hanger 600. The spacer hanger 1500 can be formed from the same material as the cable hangers, such as extruded aluminum. As shown in FIG. 15B, the spacer hangers 1500 can be used to secure cable hangers 200 axially offset from cable hangers 200 attached directly to the support wire 10, while also keeping the cable hanger 200 vertically aligned. The hook 1502 is similar to the hook 202, where the hook 1502 is arranged on the support wire 10 and then crimped closed. Additionally, the hook 202 of a cable hanger 200 is passed through the loop 1510 and then crimped closed to secure the cable hanger 200 to the spacer hanger 1500. This arrangement can increase the carrying capacity of a cable hanging system without placing additional strain on single hooks 202 of cable hangers 200, which can be support multiple cable hangers or additions.

Figure 16A:
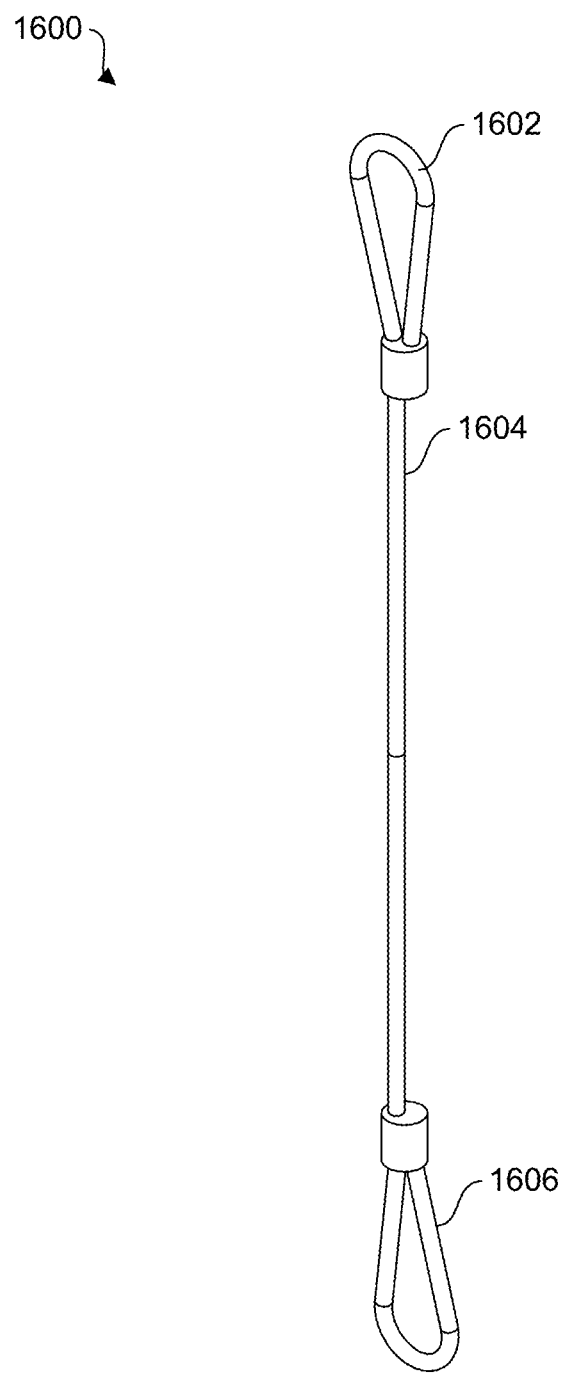
FIG. 16A is a front perspective view of an implementation of an extension bar of a cable hanger system.
Figure 16B:
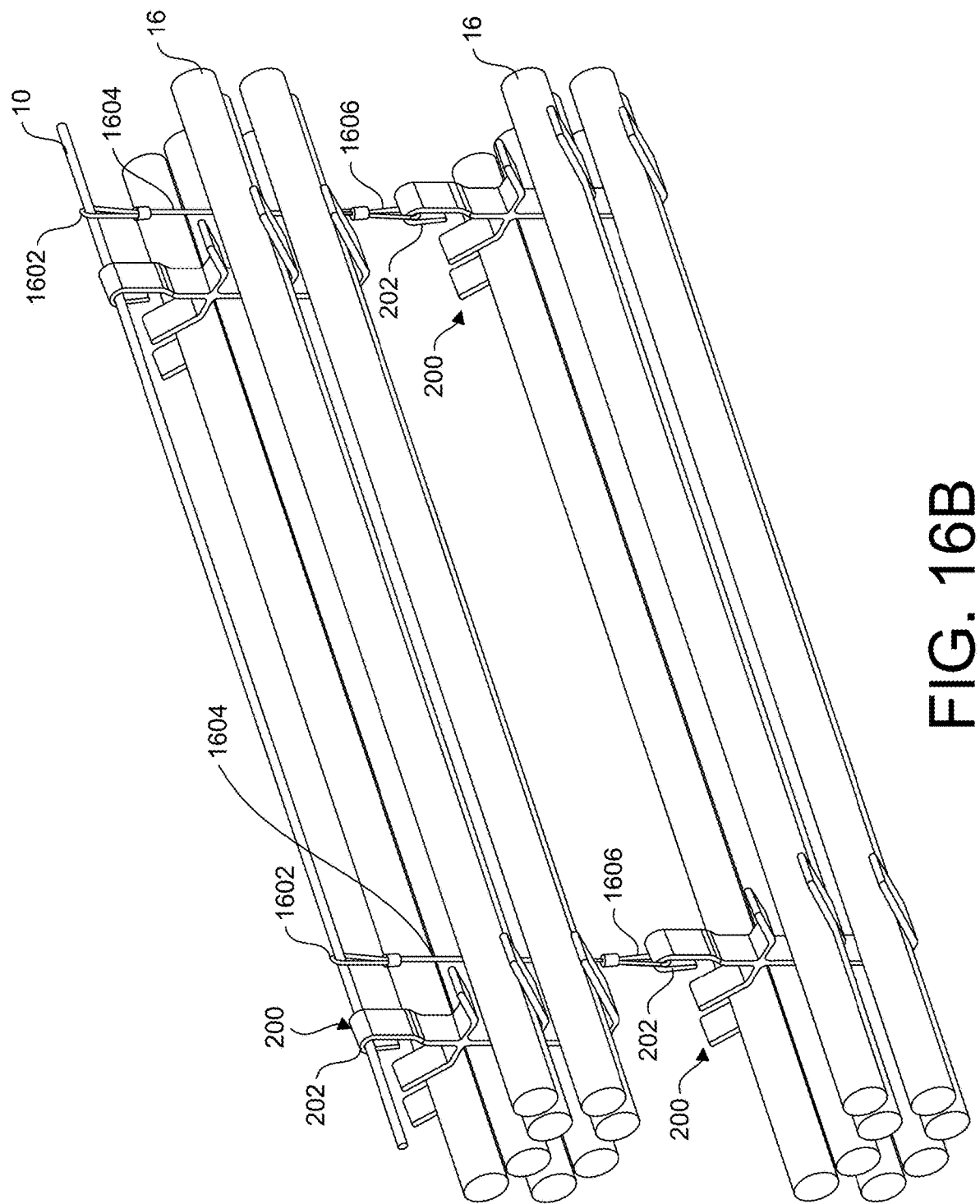
FIG. 16B is a front perspective view of an implementation of a cable hanger system having the extension bar of FIG. 16A.

FIGS. 16A-16B illustrate a similar cable hanger system as depicted in FIGS. 15A-15B. Instead of a spacer hanger, the system depicted in FIGS. 16A-16B utilizes a spacer cable 1600. The spacer cable 1600 includes a proximal looped end 1602, a center section 1604, and a distal looped end 1606. The proximal looped end 1602 is attached to the support wire 10, with a cable hanger 200 secured to the distal looped end 1606. As stated above, this arrangement reduces strain on a hook 202 of a cable hanger 200 while also increasing the carrying capacity of the system.

Figure 17A:
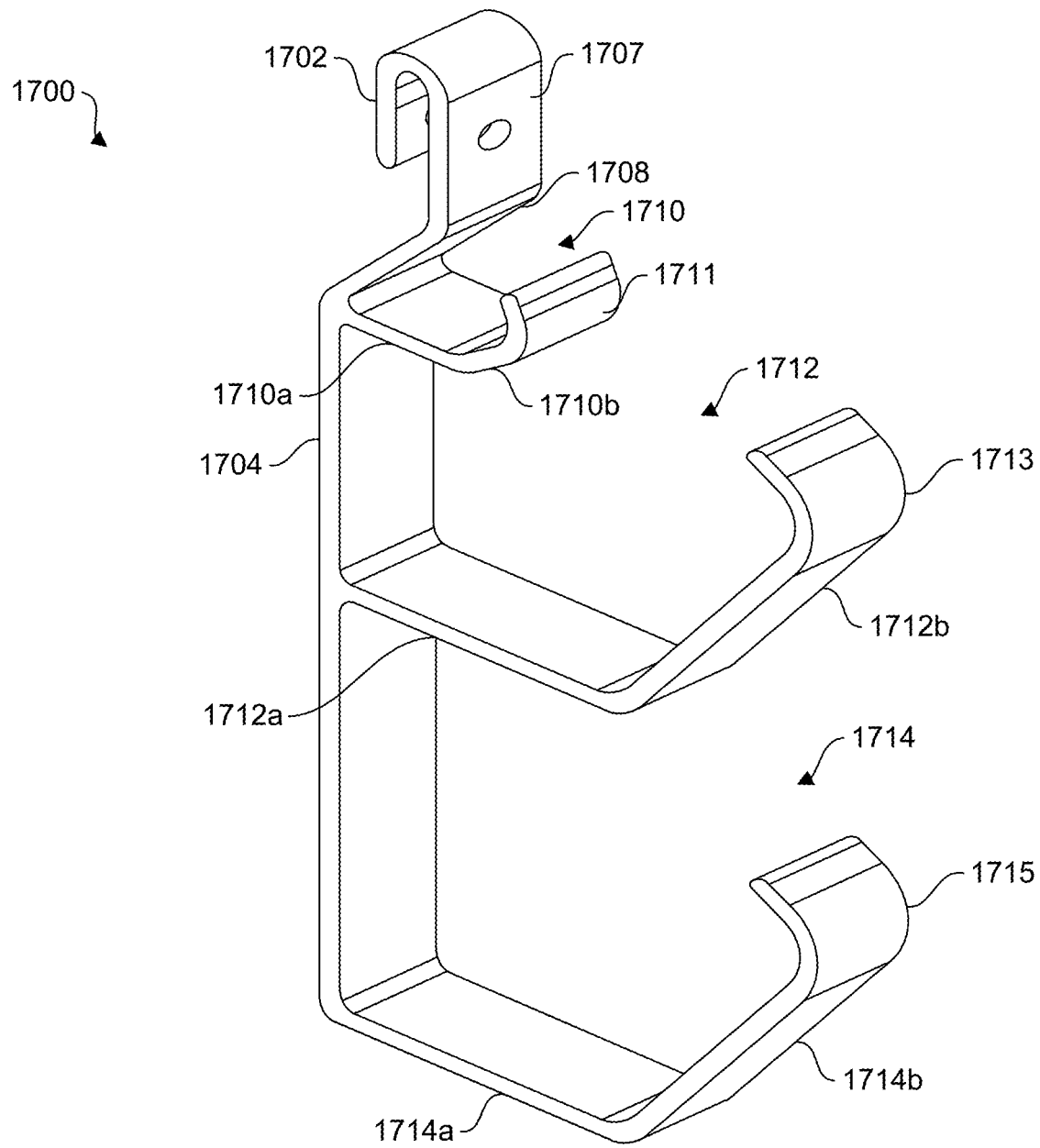
FIG. 17A is a front perspective view of one implementation of a cable hanger.
Figure 17B:
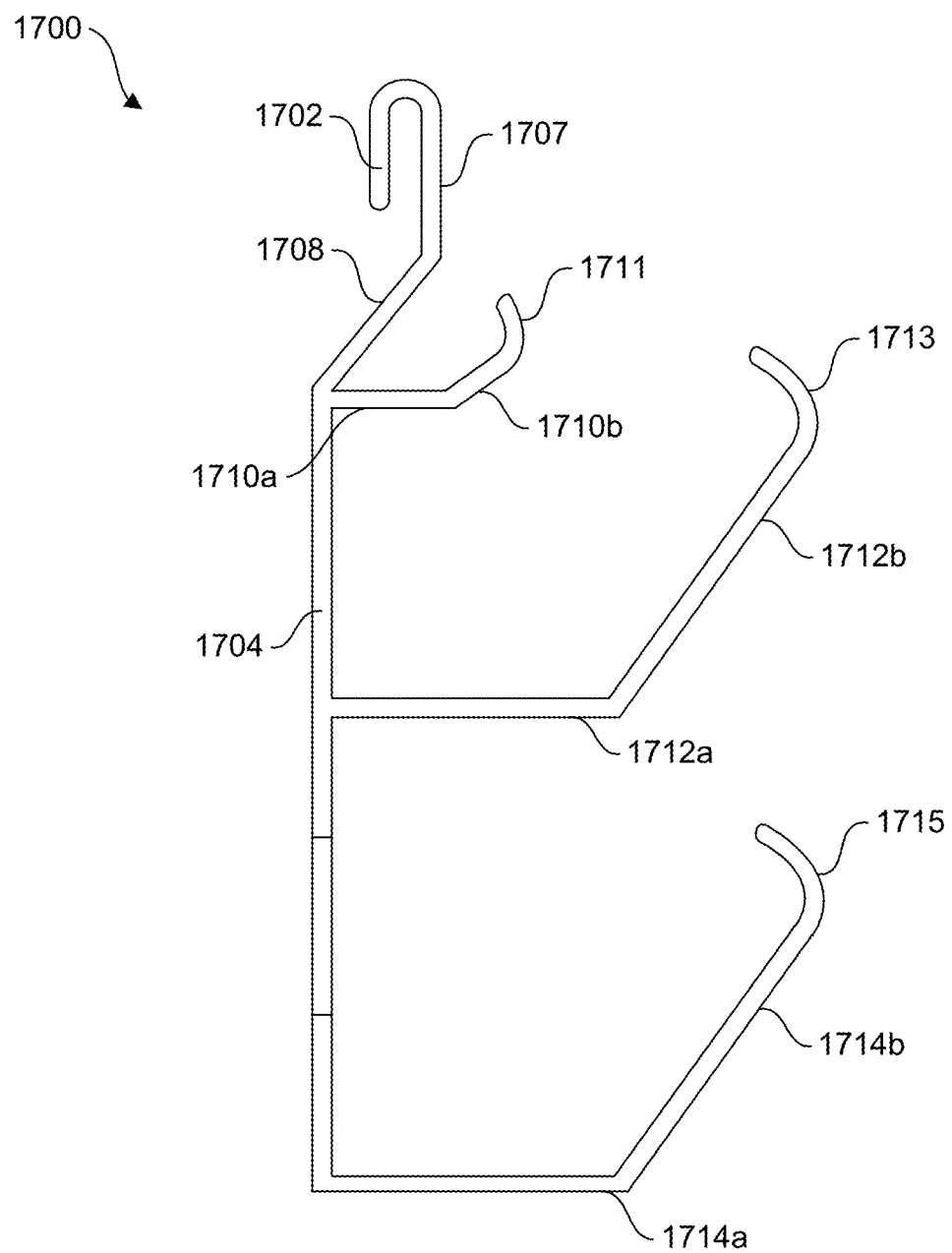
FIG. 17B is a side view of the cable hanger of FIG. 17A.

In addition to the exemplary implementations of cable hangers previously described, a cable hanger can include cable saddles on a single side of the cable hanger while still remaining balanced. FIGS. 17A-17B illustrate an implementation of a cable hanger 1700. The cable hanger 1700 includes a hook 1702, a center support member 1704, and a plurality of cable saddles. The cable hanger 1700 can be attached to a support wire running parallel to the power cables and/or signal wires. In an exemplary implementation, the cable hanger 1700 can be manufactured as one single piece by an extrusion process, similar to the cable hanger 100.

In order to support wires, the cable hanger 100 is attached to a support wire by the hook 102. The hook 1702 is arranged on the proximal end of the center support member 1704 such that a majority of the cable hanger 1700 is arranged below the support wire. As with the cable hanger 100, the cable hanger 1700 includes an offset leg 1708 connected to the hook 1702 by a hook support leg 1707, in order to keep the cable hanger 1700 balanced when loaded with cables and wires. As compared to the offset leg 108, the offset leg 1708 can be arranged at a greater angle relative to the hook support leg 1707 since the saddles of the cable hanger 1700 are arranged on a single side of the cable hanger.

In order to properly support wires and wires, the cable hanger 1700 includes a plurality of cable saddles of different shapes and sizes. In the illustrated implementation, the cable hanger 1700 includes a small cable saddle 1710, a large cable saddle 1712, and a large cable saddle 1714. The small cable saddle can be arranged on the center support member 1704 proximally to the saddles 1712, 1714. The saddles 1712, 1714 can be arranged on center support member 1704, with the saddle 1712 arranged proximal to the saddle 1714, which is arranged on the distal end of the center support member 1704.

The saddle 1710 is formed from extension 1710a, extending perpendicular from the center support member 104, and extension 1710b, extending at an angle from the extensions 1710a. The extension 1710b can also include a curved end 1711 arranged at the end of the extension 1710b. Similar to the saddle 1700, the saddle 1712 is formed from extension 1712a, extending perpendicular from the center support member 1704, and extension 1712b, extending at an angle from the extension 1712a. The extension 1712b can also include a curved end 1713 arranged at the end of the extension 1712b. Additionally, the saddle 1714 is formed from extension 1714a, extending perpendicular from the center support member 1704, and extension 1714b, extending at an angle from the extensions 1714a. The extension 1714b can also include a curved end 1715 arranged at the end of the extension 1714b.

Figure 18A:
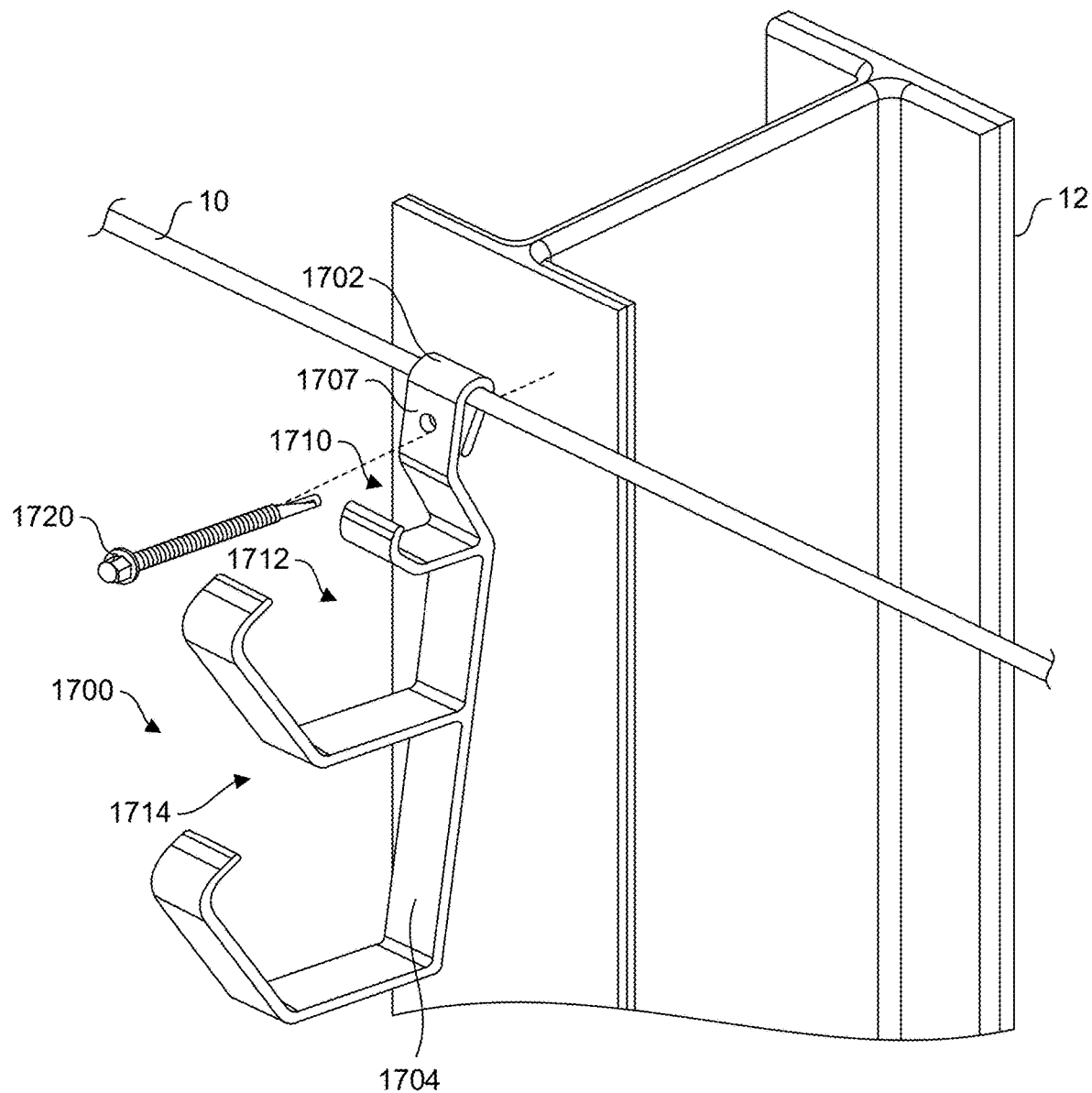
FIG. 18A is a front perspective view of another implementation of a cable hanging system having the cable hanger of FIG. 17A.

Similar to the cable hanger 100, the cable hanger 1700 can be secured to a support wire 10 by the hook 1702. Additionally, the cable hanger 1700 can be secured to a tracker, or support pile, 12 using a screw 1720, as shown in FIG. 18A. In an exemplary implementation, the hook 1702 and the hook support leg 1707 can each include an aperture arranged therein to allow the screw 1720 to pass through the cable hanger 1700. The screw 1720 can be passed through the apertures, and screwed into the tracker 12, securing the cable hanger 1700 to the tracker 12. The action of torquing the screw 1720 can crimp the hanger 1700 on the support wire 10, creating the needed clamping force to grip onto the support wire 10, and not allowing the support wire 10 to slip out of the hanger hook 1702. In this exemplary implementation, the support wire 10 can be optional since the cable hanger 1700 is secured to the tracker 12. Additionally, the cable hanger can serve as a bonding path to the support wire, and further to a structural member, such as a tracker, supporting the support wire.

Figure 18B:
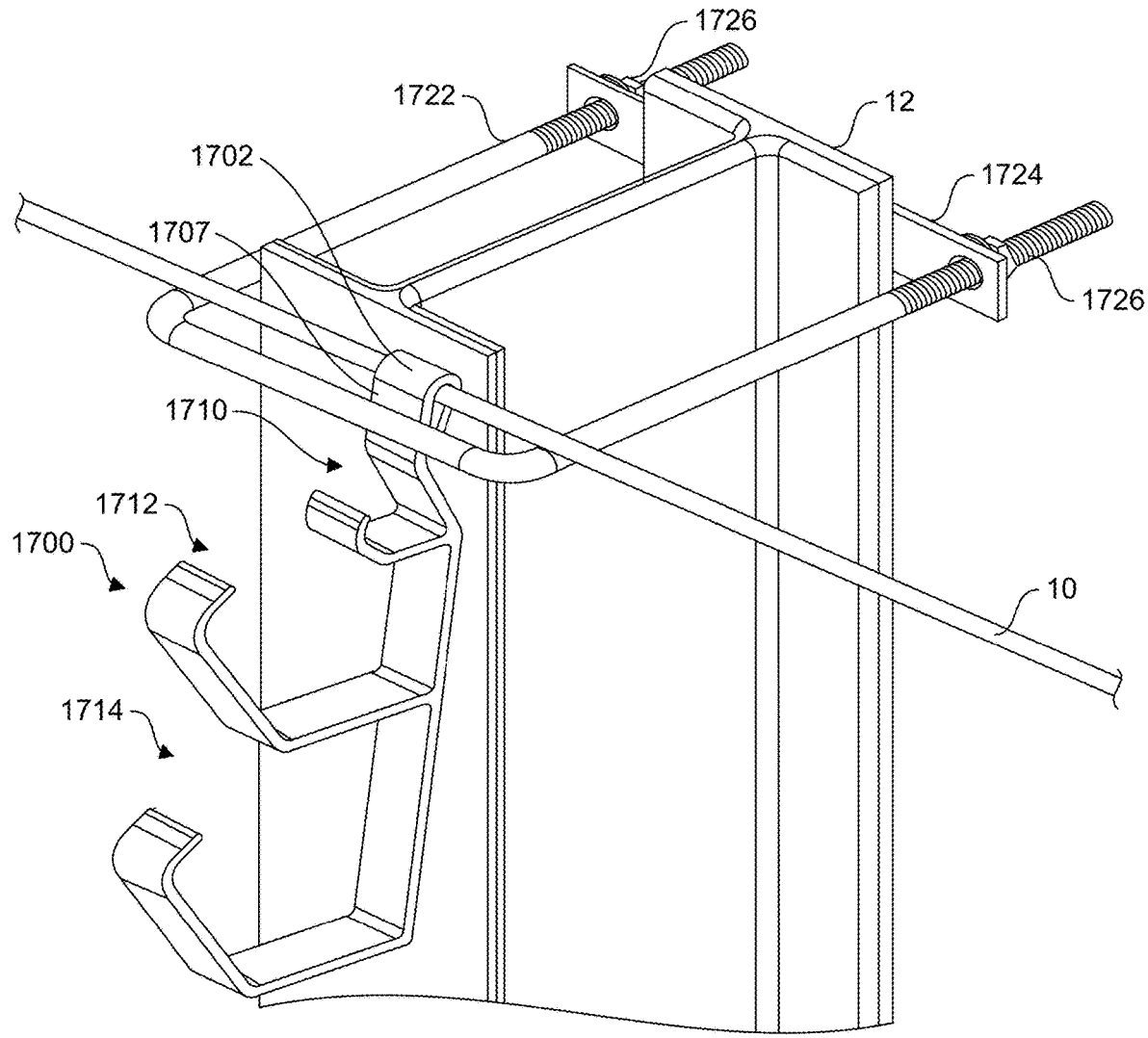
FIG. 18B is a front perspective view of another implementation of a cable hanging system having the cable hanger of FIG. 17A.

A removable securement means can also be used to secure the cable hanger 1700 to a tracker 12. As shown in FIG. 18B, a U-bolt 1722 can be used in place of a screw. The U-bolt 1722 can be arranged to abut the hook support leg 1707. The U-bolt 1722 can be tightened to the tracker 12 using a plate 1724 to provide a compression of the tracker 12 on both sides, while nuts 1726 are threaded onto the U-bolt 1722 and tightened. In this exemplary implementation, the tightening of the U-bolt 1722 can cause the crimping of the hook 1702 onto the support wire 10. Additionally, the support wire 10 can be optional since the cable hanger 1700 is secured to the tracker 12.

Figure 19A:
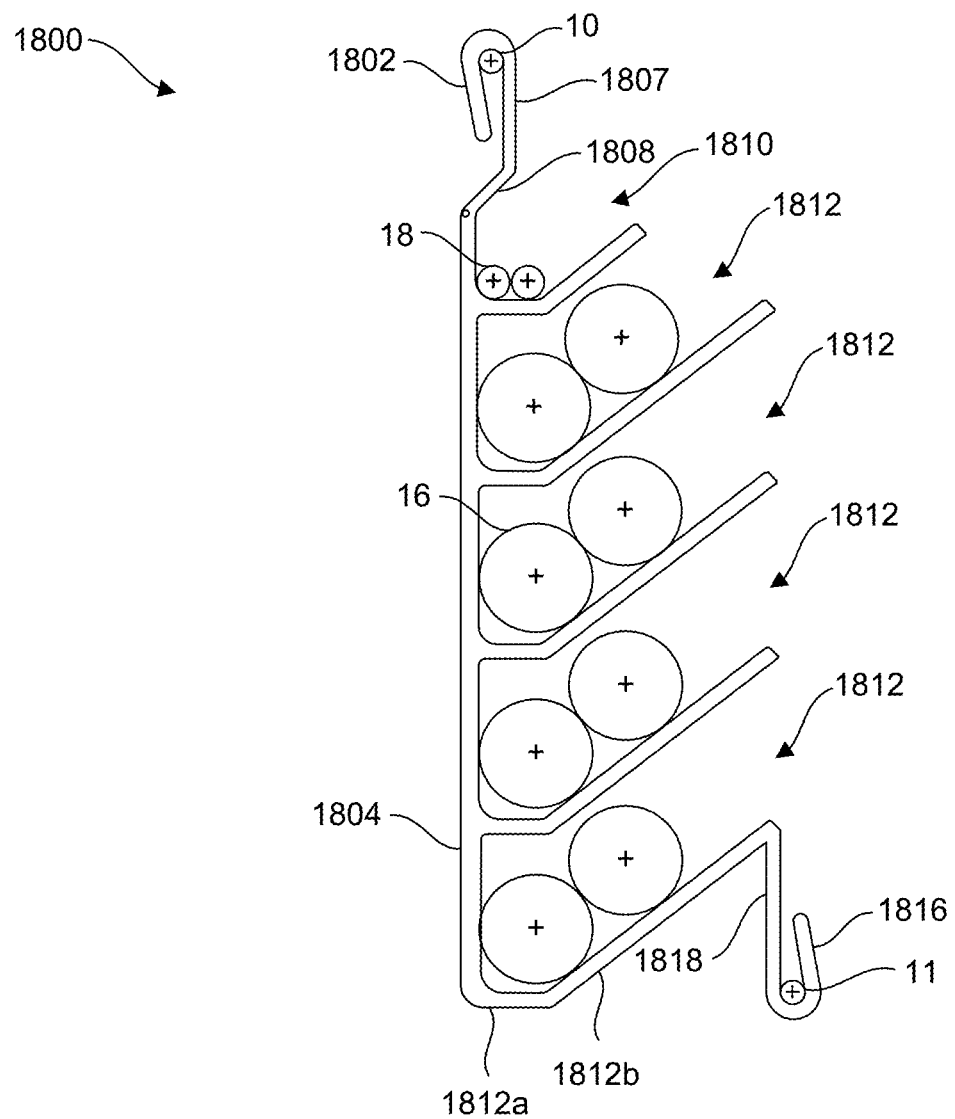
FIG. 19A is a side view of another implementation of a cable hanger.

Similar to the exemplary implementations of the cable hangers having multiple saddles, cable hangers with saddles arranged on a single side of the cable hanger can also include additional saddles. In addition to carrying cables, a single-sided cable hanger can be configured to act as a grounding lug and/or a post attachment device. FIG. 19A illustrates a cable hanger 1800 having a hook 1802, a center support member 1804, a hook support leg 1807, an offset leg 1808, and saddles 1810, 1812. Additionally, a hook 1816 can be arranged on the cable hanger 1800 to further secure the cable hanger 1800 to grounding cable 11. While attached to the grounding cable 11, the cable hanger 1800 can act as a grounding lug or grounding interface, meeting the requirements of the UL 467 standard. Similar to the cable hanger 1700, the saddles 1812 are formed from extension an 1812a, extending perpendicular from the center support member 1804, and an extension 1812b, extending at an angle from the extension 1812a. A hook support leg 1818 is arranged at the end of the extension 1812a, with a hook 1816 connected to the hook support leg 1818. The hook 1816 is similar to the hook 1802, and is crimped around the cable 11 once arranged within the gap of the hook 1816.

Figure 19B:
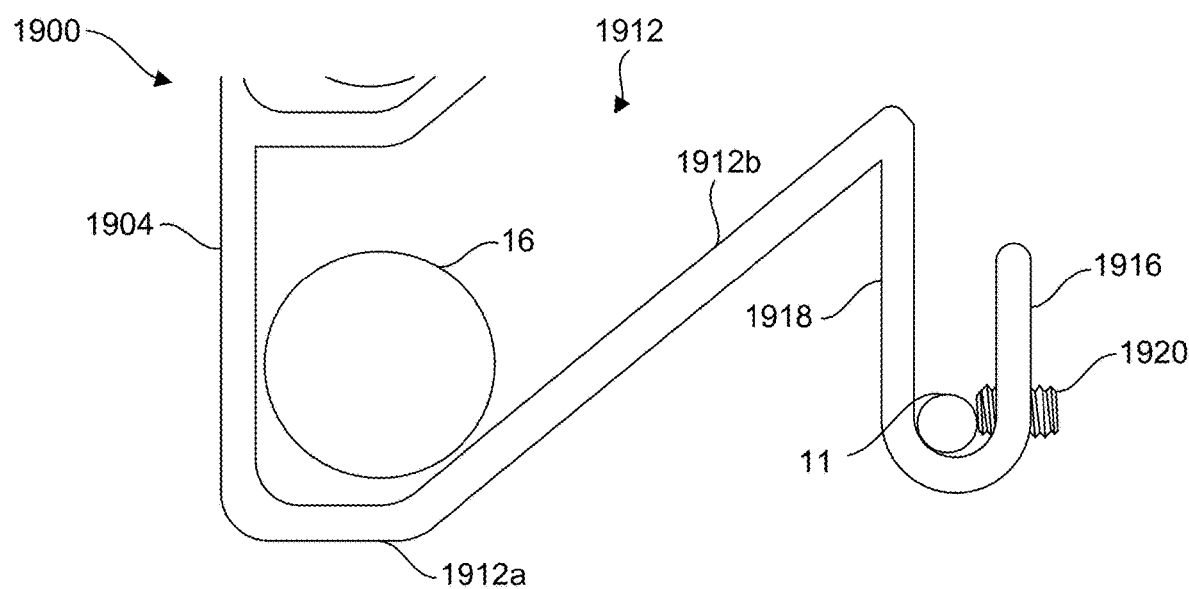
FIG. 19B is a detailed side view of another implementation of a cable hanger.

Instead of crimping the hook closed about a cable, various types of securement means can be used to secure the cable within the hook. FIG. 19B illustrates an exemplary implementation of a cable hanger 1900. The cable hanger 1900 is substantially similar to the cable hanger 1800, and includes a center support member 1904, a saddle 1912 formed from extensions 1912a, 1912b, a hook 1916, and a hook support leg 1918. However, instead of crimping the hook 1916 to secure the cable 11, a set screw 1920 can be arranged within a threaded hole in the side of the hook 1916. In this way, the cable hanger can provide a positive mechanical attachment to secure the cable hanger 1900 to the messenger cable 11, without the need for crimping tools.

Figure 20A:
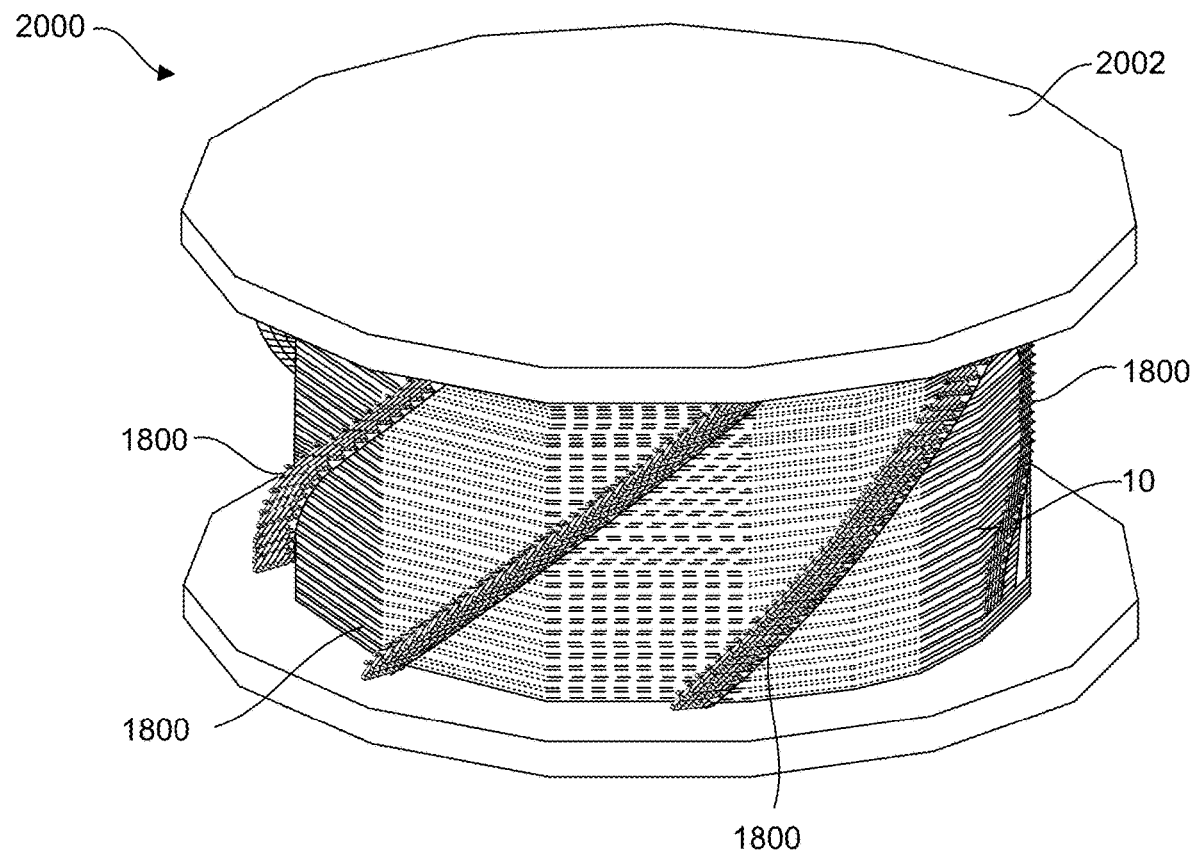
FIG. 20A is a front perspective view of another implementation of a cable hanger system stored on a spool.
Figure 20B:
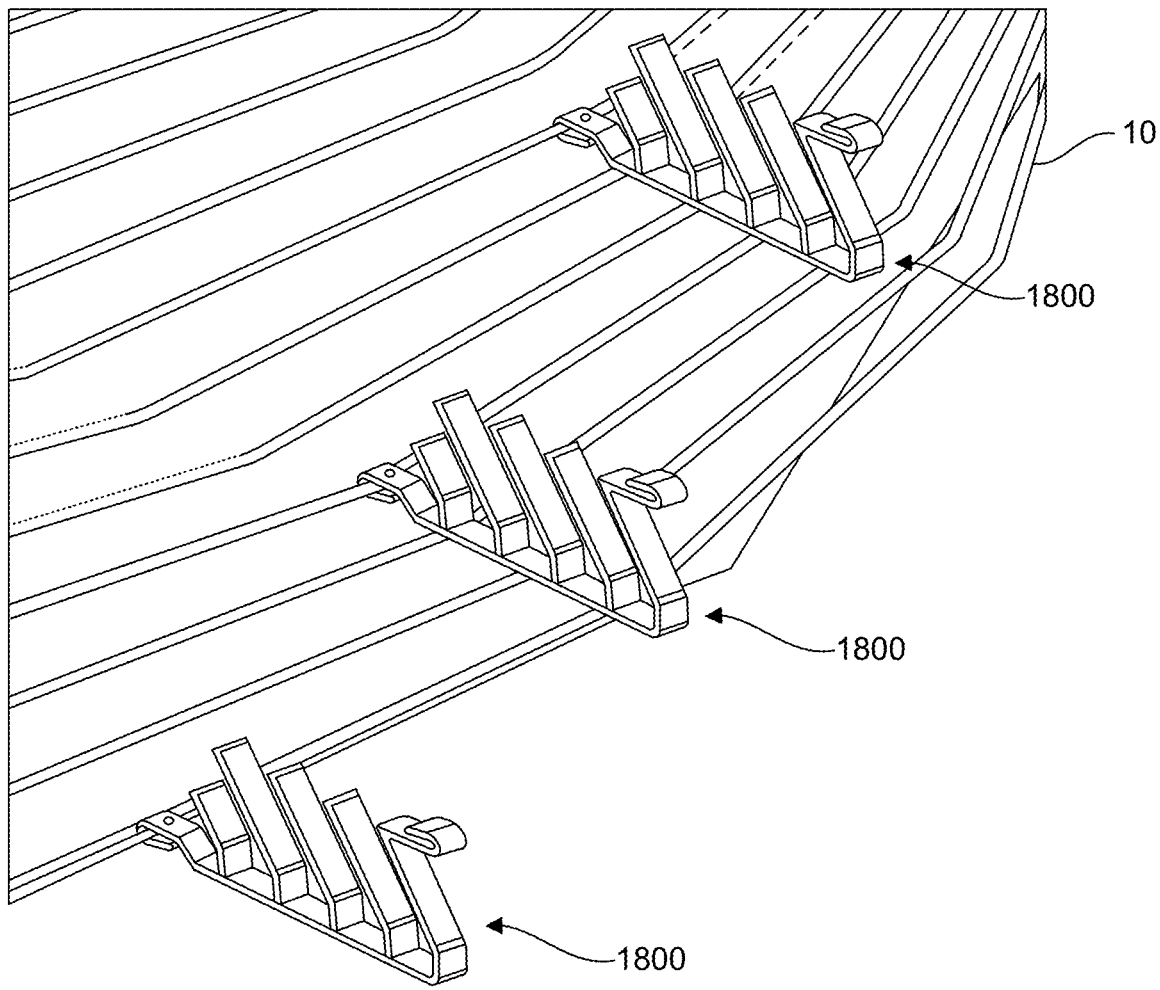
FIG. 20B is a detailed perspective view of the cable hanger system of FIG. 20A.

In some exemplary implementations, the cable hangers are secured to a support wire which has already been secured to the structures of the solar panels. However, in some exemplary implementations, the cable hangers can be secured to a support wire prior to being attached to the Piles or structures. FIGS. 20A-21B illustrate cable hanger systems that include cable hangers secured to the support wire prior to being installed on a solar panel support structure. FIGS. 20A-20B depict a cable hanger system 2000, where a plurality of cable hangers 1800 are secured to a support wire 10. The support wire 10 can be wound around a spool 2002, which can be easily transported to an installation site. The support wire 10 can be unwound with the cable hangers 1800 attached, which saves on installation time since each cable hanger 1800 can already been installed at a predetermined space on the support wire. In an exemplary implementation, the cable hangers 1800 can be attach to the support wire 10 while the support wire 10 is wound on the spool 2002.

Figure 21A:
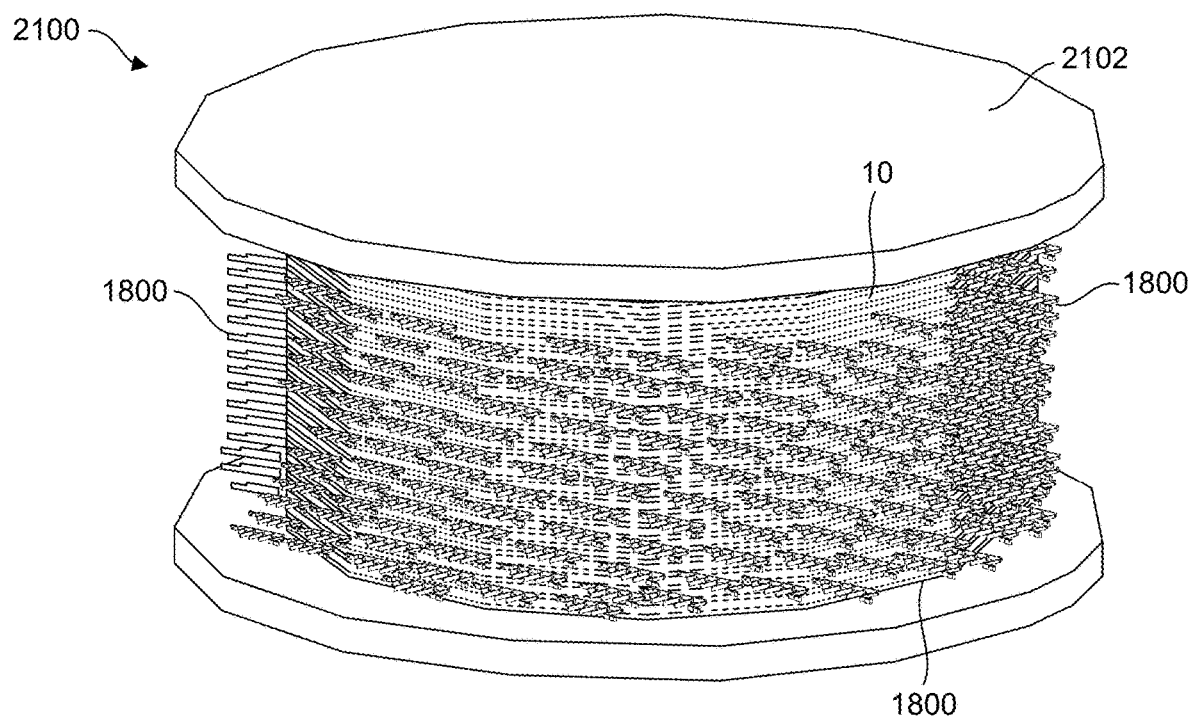
FIG. 21A is a front perspective view of another implementation of a cable hanger system stored on a spool.
Figure 21B:
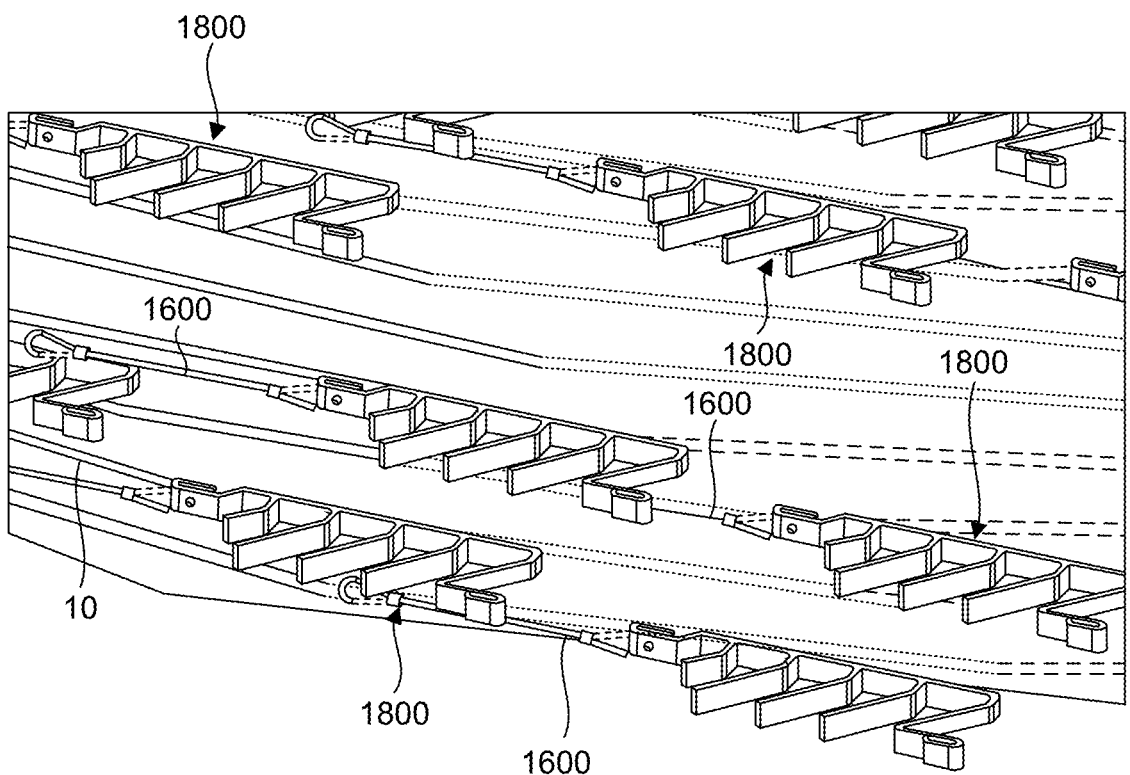
FIG. 21B is a detailed perspective view of the cable hanger system of FIG. 21A.

FIGS. 21A-21B illustrate a similar cable hanging system 2100, where a plurality of cable hangers 1800 are secured to a support wire 10 wound on a spool 2102. The system 2100 further includes spacer cables 1600 attached to the cable hangers 1800. In the illustrated implementation, the spacer cables 1600 attach the cable hangers 1800 to the support wire 10, allowing the cable hangers 1800 to be aligned with the winding direction of the support wire 10 on the spool 2102.

Figure 22A:
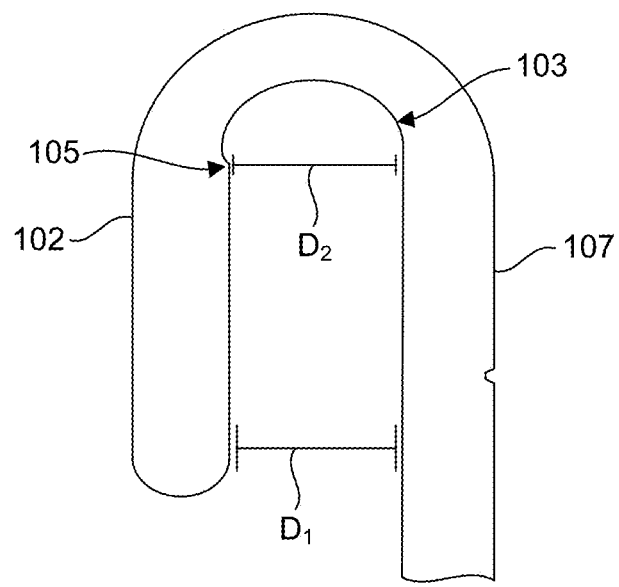
FIG. 22A is a side view of one implementation of a hanging mechanism for a cable hanger.

As stated previously, the hook of a cable hanger can be crimped to the support wire to attach the cable hanger to the support wire. FIG. 22A illustrates an exemplary implementation of the hook 102. As shown in FIG. 22A, the opening of the hook 102 can be a distance $D_1$, which is wider than the upper radius 103 of the hook 102. This can allow the messenger cable to sufficiently sit in the upper radius 103 of the hook 102. In addition, the wider opening distance $D_1$ can provide additional leverage onto the support wire when the hook 102 is crimped to the support wire. In an exemplary implementation, an integrated locking-nub 105 can be arranged adjacent to the upper radius 103. The locking-nub 105 requires the support wire 10 to squeeze through the opening having a distance $D_2$, which is a smaller length than the radius of the support wire 10. Due to this, friction is created between the support wire 10 and the upper radius 103, which prevents the support wire from being dislodged from the hook 102.

Figure 22B:
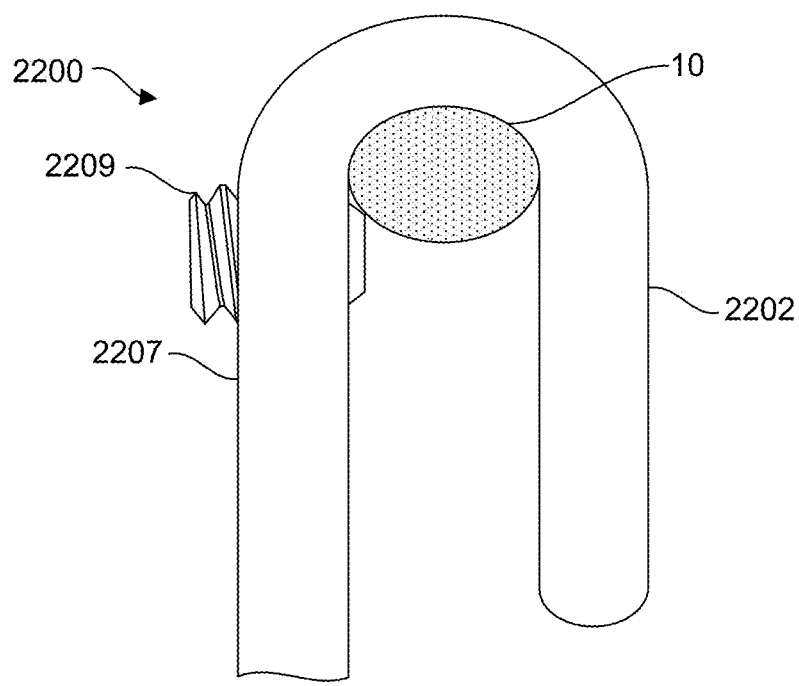
FIG. 22B is a side view of another implementation of a hanging mechanism for a cable hanger.

However, various types of securement device can be used to attach the cable hanger to the support wire. FIG. 22B illustrates an exemplary implementation of a cable hanger 2200. The cable hanger 2200 is similar to the cable hanger 100, and includes a hook 2202 and a hook support leg 2207. Instead of crimping the hook 2202, a set screw 2209 is arranged within a threaded hole in the side of the hook support leg 2207. In this way, the cable hanger can provide a positive mechanical attachment to secure the cable hanger 2200 to the support wire 10. After the support wire 10 is arranged within the hook 2202, the set screw 2209 can be tightened to abut the support wire 10, creating friction between the support wire 10, the set screw 2209, and the hook 2202. The friction between the components will prevent rotation of the cable hanger 2200 on the support wire 10.

Figure 22C:
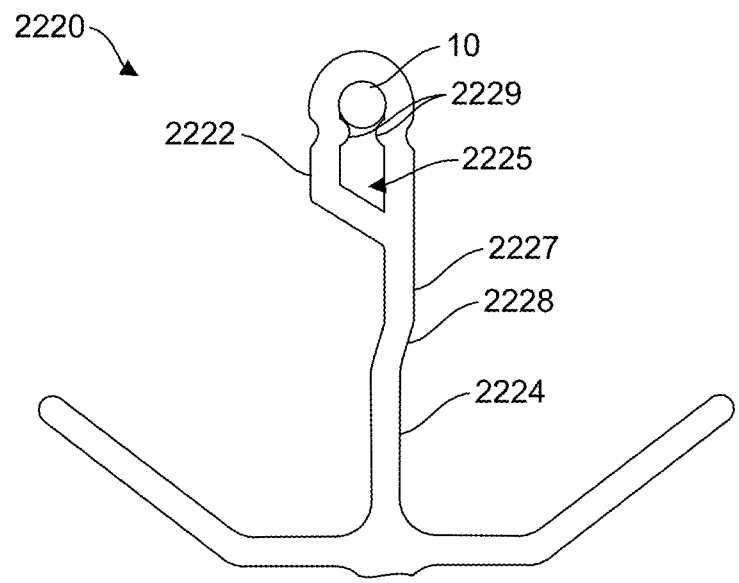
FIG. 22C is a side view of another implementation of a hanging mechanism for a cable hanger.

FIG. 22C illustrates another exemplary implementation of a cable hanger having a different securement method. The cable hanger 2220 is similar to the cable hanger 100, and includes a hook support leg 2227, an offset leg 2228, and a center support member 2224. The cable hanger 2220 also includes a securement loop 2222 in place of a hook. An aperture 2225 is formed by the securement loop 2222, with the support wire 10 passing therethrough. To further secure the support wire 10 to the cable hanger 2220, the securement loop 2222 can be deformed to produce tabs 2229 within the aperture 2225. The tabs 2229 are arranged adjacent to the support wire 10, with the support wire 10 abutting the upper radius of the loop 2222. The tabs 2229 can create friction between the loop 2222 and the support wire 10, prevent dislodgment or rotation of the cable hanger 2220 on the support wire 10.

Figure 22D:
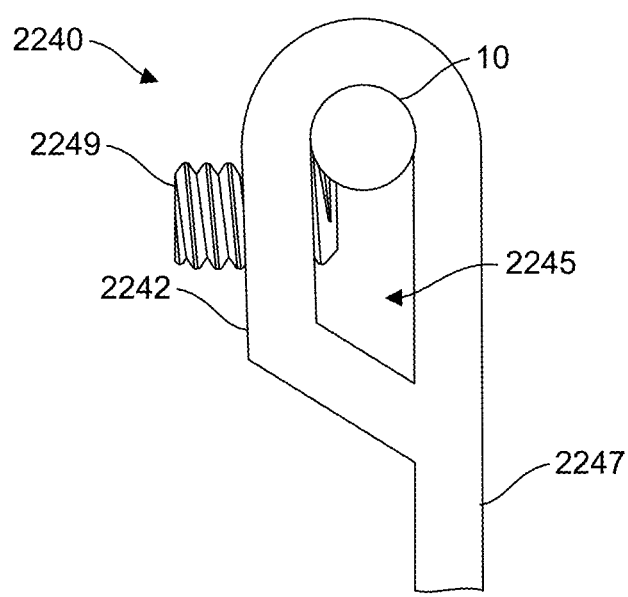
FIG. 22D is a side view of another implementation of a hanging mechanism for a cable hanger.

FIG. 22D illustrates another exemplary implementation of a cable hanger having a different securement method. The cable hanger 2240 is similar to the cable hanger 2220, and includes a securement loop 2242 and a hook support leg 2247. An aperture 2245 is formed by the securement loop 2242, with the support wire 10 passing therethrough. To further secure the support wire 10 to the cable hanger 2240, a set screw 2249 is arranged within a threaded hole in the side of the loop 2242. In this way, the cable hanger can provide a positive mechanical attachment to secure the cable hanger 2240 to the support wire 10.

Figure 23A:
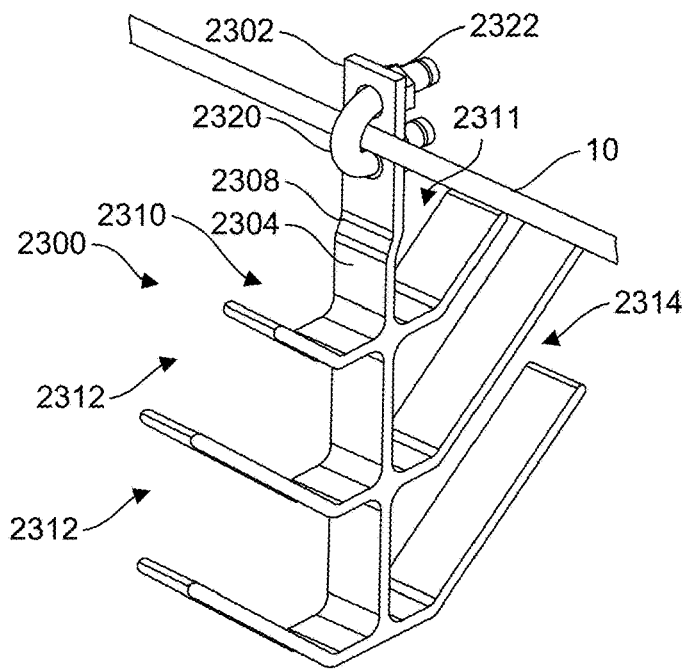
FIG. 23A is a front perspective view of another implementation of a cable hanger having a hanging mechanism.
Figure 23B:
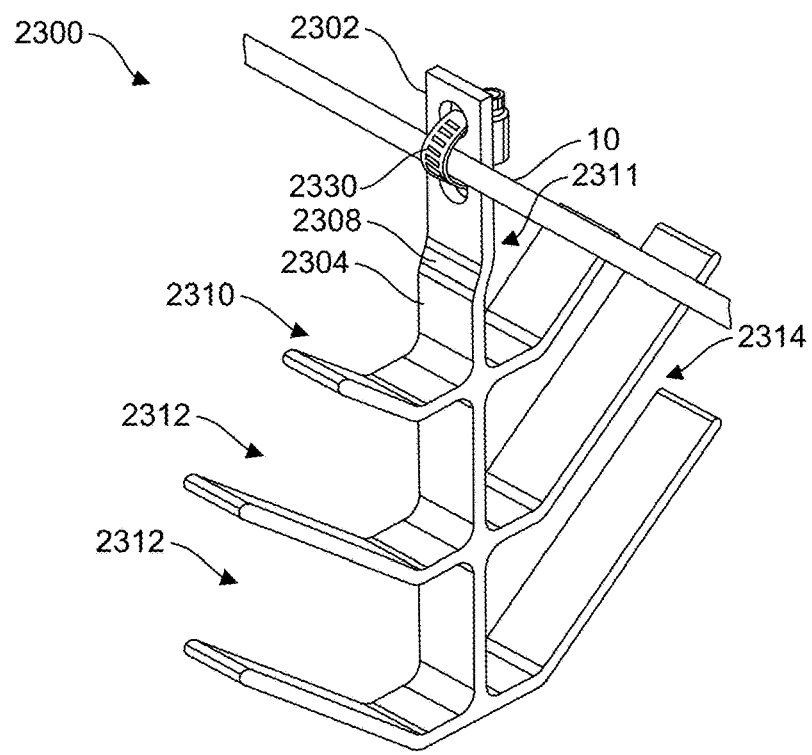
FIG. 23B is a front perspective view of another implementation of a cable hanger having a hanging mechanism.

FIG. 23A illustrates another exemplary implementation of a cable hanger having a different securement method. The cable hanger 2300 is similar to the cable hanger 220, and includes a support leg 2302, an offset leg 2308, a center support member 2304, and saddles 2310, 2311, 2312, 2314. Instead of a hook, the cable hanger 2300 includes apertures arranged within the support leg 2302, with a U-bolt 2320 passing through the apertures. The support wire 10 can be arranged within the gap formed between the U-bolt 2320 and the support leg 2302. The U-bolt 2320 can be secured within the apertures by nuts 2322 threaded onto the U-bolt 2320. FIG. 23B illustrates another implementation of the cable hanger 2300. However, instead of a U-bolt, the cable hanger 2300 is attached to the support wire 10 by a hose clamp 2330 passing through the apertures of the support leg 2302.

Figure 24A:
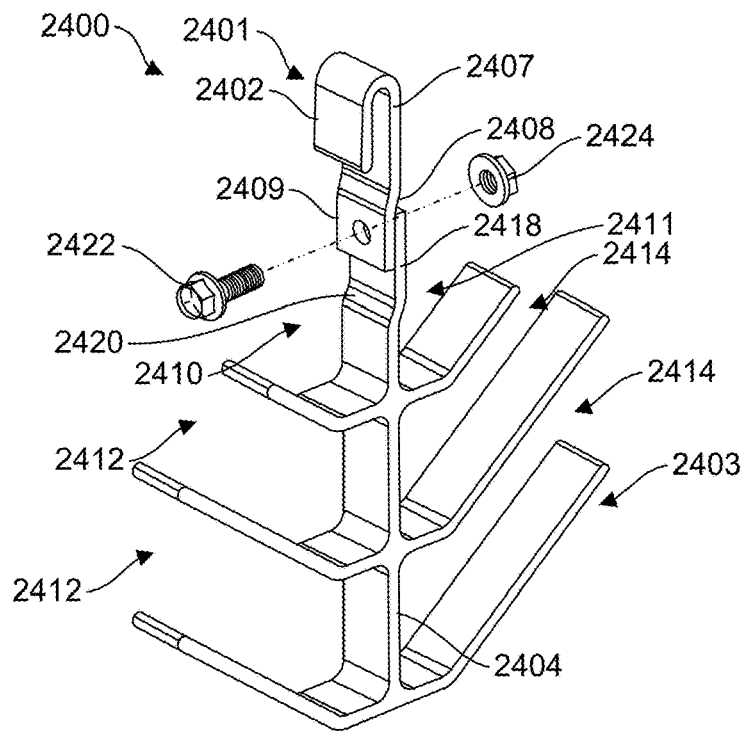
FIG. 24A is a front perspective view of another implementation of a cable hanger having a separate hanging mechanism.

In addition to having various types of securement methods to secure a cable hanger to the support wire, the hooks of a cable hanger can be a separate component to the cable hanger. FIGS. 24A-24D illustrate exemplary implementations of cable hangers having separate hook portions secured to the cable hanger bodies. FIG. 24A illustrates a cable hanger 2400 having a hook portion 2401 and a hanger body 2403. The hook portion 2401 includes a hook 2402, a hook support leg 2407, an offset leg 2408, and an attachment flange 2409. The hanger body 2403 is substantially similar to the cable hanger 200, and includes a center support member 2404, saddles 2410, 2411, 2412, 2414, an attachment flange 2418, and an offset leg 2420. In an exemplary implementation, both of the attachment flanges 2409, 2418 include an aperture therein to allow a bolt 2422 to pass therethrough, securing the hook portion 2401 to the hanger body 2403. The bolt 2422 is secured within the apertures by a nut 2424 threaded onto the bolt 2422.

Figure 24B:
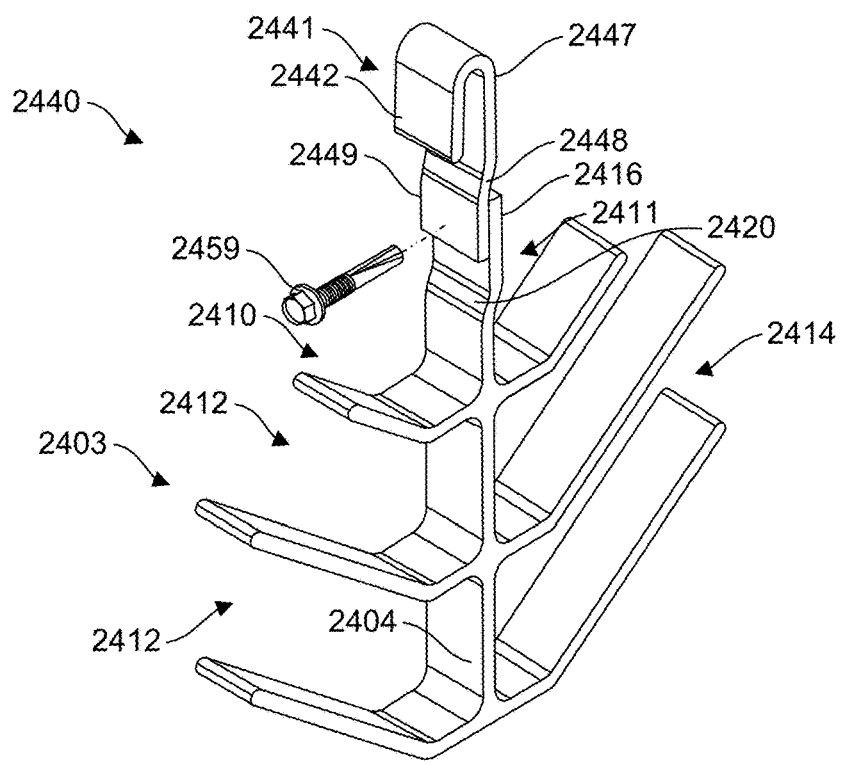
FIG. 24B is a front perspective view of another implementation of a cable hanger having a separate hanging mechanism.

FIG. 24B illustrates a cable hanger 2440 which includes a hook portion 2441 and the hanger body 2403. The hook portion 2441 is similar to the hook portion 2401, and includes a hook 2442, a hook support leg 2447, an offset leg 2448, and an attachment flange 2449. However, the attachment flange 2449 does not include an aperture, and instead a self-driving screw 2459 can be used to secure the hook portion 2441 to the hanger body 2403. The screw 2459 can be arranged perpendicular to the attachment flanges 2416, 2449, and driven through the attachment flanges 2416, 2449 when the flanges are aligned, securing the hook portion 2441 to the hanger body 2403.

Figure 24C:
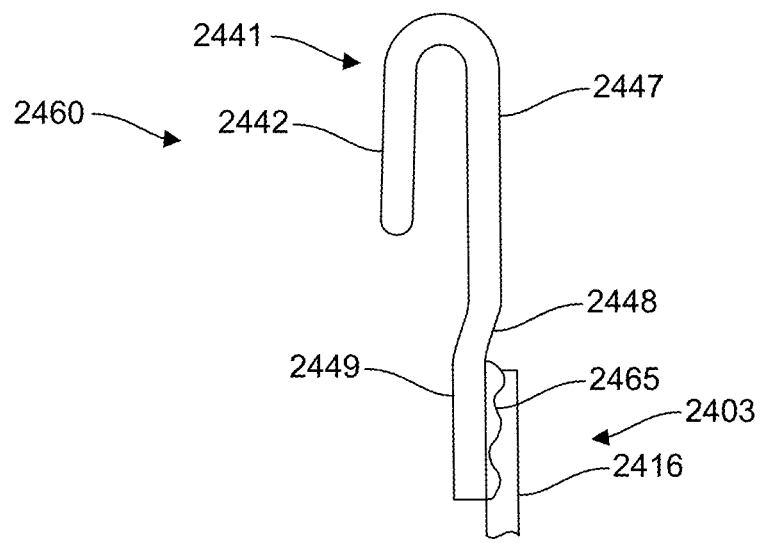
FIG. 24C is a front perspective view of another implementation of a cable hanger having a separate hanging mechanism.

FIG. 24C illustrates another implementation of a cable hanger having a separate hook portion. The cable hanger 2460 is substantially similar to the cable hanger 2440, and includes the hook portion 2441 and the hanger body 2403. However, instead of using a screw to screw the hook portion 2441 to the hanger body 2403, an adhesive 2465 can be used to secure the components together. The adhesive 2465 can be in the form of adhesive tape, epoxy, or welded material.

Figure 24D:
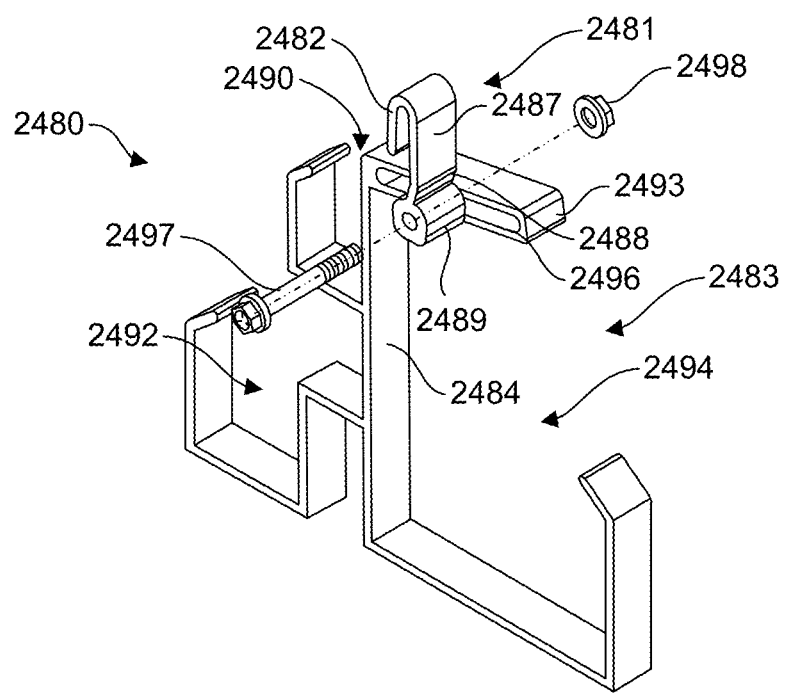
FIG. 24D is a front perspective view of another implementation of a cable hanger having a separate hanging mechanism.

FIG. 24D illustrates another exemplary implementation of a cable hanger having a separate hook portion. The hanger 2480 includes a hook portion 2481 and a hanger body 2483. The hook portion 2481 includes a hook 2482, a hook support leg 2487, an offset leg 2488, and an attachment flange 2489. The hanger body 2483 is substantially similar to the cable hanger 500, and includes a center support member 2484, saddles 2490, 2492, 2494, and an attachment flange 2493. The attachment flange 2493 can include a slot 2496 arranged therein such that a bolt 2497 can pass through the attachment flange 2493. In order to secure the hook portion 2481 to the hanger body 2483, the bolt 2497 is passed through the aperture of the attachment flange 2489 and the slot 2496. The bolt 2497 is secured within the aperture and slot by the nut 2498. Since the slot 2496 is arranged substantially perpendicular to the center support member 2484, the hook portion 2481 can be adjusted relative to the hanger body 2483 in order to ensure the center-of-gravity of the cable hanger 2480 is vertically aligned with the gap of the hook portion 2481 which the support wire is arranged in. In this exemplary implementation, the saddles 2490, 2492, 2494 can be loaded with different amounts of cables with the cable hanger 2480 still being able to balance and prevent rotation of the cable hanger 2480.

Certain exemplary implementations will now be described to provide an overall understanding of the principles of the structure, function, manufacture, and use of the devices and methods disclosed herein. One or more examples of these implementations are illustrated in the accompanying drawings. Those skilled in the art will understand that the devices and methods specifically described herein and illustrated in the accompanying drawings are non-limiting exemplary implementations and that the scope of the present invention is defined solely by the claims. The features illustrated or described in connection with one exemplary implementation may be combined with the features of other implementations. Such modifications and variations are intended to be included within the scope of the present invention.

Further, in the present disclosure, like-named components of the implementations generally have similar features, and thus within a particular implementation each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Sizes and shapes of the systems and devices, and the components thereof, can depend at least on the anatomy of the subject in which the systems and devices will be used, the size and shape of components with which the systems and devices will be used, and the methods and procedures in which the systems and devices will be used. In addition, the terms "about" and "substantially" are defined as ranges based on manufacturing variations and variations over temperature and other parameters.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

One skilled in the art will appreciate further features and advantages of the invention based on the above-described implementations. Accordingly, the present application is not to be limited by what has been particularly shown and described, except as indicated by the appended claims. All publications and references cited herein are expressly incorporated by reference in their entirety.

The invention claimed is:

1. A cable hanger, comprising:
   a first support member including a proximal end and a distal end, wherein a bottom surface is positioned at the distal end;
   a first hook arranged at the proximal end of the first support member and configured to attach the cable hanger to a support wire;
   a first saddle positioned on the first support member;
   a second saddle positioned horizontally adjacent to the first saddle; and
   a saddle extension, comprising:
      a second support member having a proximal end and a distal end;
      a third saddle positioned on the second support member; and
      a second hook arranged on the proximal end of the saddle extension and configured to attach to the first saddle to connect the saddle extension to the first saddle, wherein the second hook extends vertically above the bottom surface of the first support member.

2. The cable hanger of claim 1, wherein the second hook is positioned axially outward of the first hook relative to a centerline of the cable hanger.

3. The cable hanger of claim 1, wherein the saddle extension comprises a fourth saddle horizontally adjacent to the third saddle.

4. The cable hanger of claim 1, wherein the bottom surface of the first support member defines a bottom surface of the first saddle.

5. The cable hanger of claim 1, wherein the second hook is configured to partially surround a portion of the first saddle.

6. The cable hanger of claim 1, wherein the first saddle includes a top surface configured to support a cable positioned within the first saddle and second hook.

7. The cable hanger of claim 1, wherein the first saddle and the third saddle are vertically aligned.

8. The cable hanger of claim 1, wherein a third hook is arranged on the proximal end of the saddle extension, the third hook axially offset from the second hook, wherein a portion of the third hook is configured to contact a fourth saddle horizontally adjacent to the third saddle to attach the saddle extension to the third saddle, wherein the first saddle, second saddle, third saddle, and fourth saddle are positioned horizontally between the second hook and the third hook.

9. A system comprising:
   a first cable hanger; and
   a second cable hanger;
   the first cable hanger including
      a first support member including a proximal end and a distal end, wherein a bottom surface of the first support member is positioned at the distal end,
      a first hook arranged at the proximal end of the first support member and configured to attach the cable hanger to a support wire,
      a first saddle positioned on the first support member and including a top surface, and
      a second saddle positioned horizontally adjacent to the first saddle, and the second cable hanger including
      a second support member having a proximal end and a distal end;
      a third saddle positioned on the second support member; and
      a second hook arranged on the proximal end of the second cable hanger and configured to attach to the first saddle to connect the second cable hanger to the first cable hanger, wherein the second hook is configured to extend vertically above the bottom surface of the first support member and abut the top surface of the first saddle.

10. The system of claim 9, further comprising a third hanger, the third hanger including:
    a third support member having a proximal end and a distal end;
    a fourth saddle positioned on the third support member; and
    a third hook arranged on the proximal end of the third hanger and configured to attach to the third saddle to connect the third cable hanger to the second cable hanger, wherein the third hook is configured to extend vertically above a bottom surface of the second support member and abut a top surface of the third saddle.

11. The system of claim 9, wherein the second hook is a curved end of the second support member.

12. The system of claim 9, wherein the second support member is formed of a deformable material.

* * * * *